United States Patent [19]

Ataman et al.

[11] Patent Number: 4,510,618
[45] Date of Patent: Apr. 9, 1985

[54] NOISE CLEANER FOR BINARY IMAGES

[75] Inventors: Ergin' Ataman, Istanbul, Turkey; J. Thomas King, Waterloo, Canada

[73] Assignee: NCR Canada Ltd - NCR Canada LTEE, Mississauga, Canada

[21] Appl. No.: 453,561

[22] Filed: Dec. 27, 1982

[51] Int. Cl.³ .............................................. G06K 9/40
[52] U.S. Cl. ........................................ 382/54; 382/27
[58] Field of Search ............................ 382/54, 51, 27; 358/283, 284

[56] References Cited

U.S. PATENT DOCUMENTS 4,298,895 11/1981 Arai et al. ............................ 382/54

Primary Examiner—Leo H. Boudreau
Assistant Examiner—Michael Murray
Attorney, Agent, or Firm—J. T. Cavender; Edward Dugas

[57] ABSTRACT

The disclosed apparatus operates upon binary signals corresponding to a scanned image. The binary images are stored in a matrix as concentric windows of interconnected rows and columns. The binary signals contained in the rows and columns are summed and logically compared against the sums of binary signals in adjacent windows and if the sums and logical combinations do not exceed preselected amounts it is assumed that the binary signals within a particular window are spurious, and means are provided for cleaning these signals from the window. Incrementing the binary images that are stored in the matrix permit the total scanned image to be analyzed.

10 Claims, 39 Drawing Figures

| $P_{11}$ | $P_{12}$ | $P_{13}$ | $P_{14}$ | $P_{15}$ | $P_{16}$ | $P_{17}$ | $P_{18}$ | $P_{19}$ |
|---|---|---|---|---|---|---|---|---|
| $P_{21}$ | $P_{22}$ | $P_{23}$ | $P_{24}$ | $P_{25}$ | $P_{26}$ | $P_{27}$ | $P_{28}$ | $P_{29}$ |
| $P_{31}$ | | | | | | | | $P_{39}$ |
| $P_{41}$ | | | | | | | | $P_{49}$ |
| $P_{51}$ | | | | $P_{55}$ | | | | $P_{59}$ |
| $P_{61}$ | | | | | | | | $P_{69}$ |
| $P_{71}$ | | | | | | | | $P_{79}$ |
| $P_{81}$ | | | | | | | | $P_{89}$ |
| $P_{91}$ | $P_{92}$ | $P_{93}$ | $P_{94}$ | $P_{95}$ | $P_{96}$ | $P_{97}$ | $P_{98}$ | $P_{99}$ |

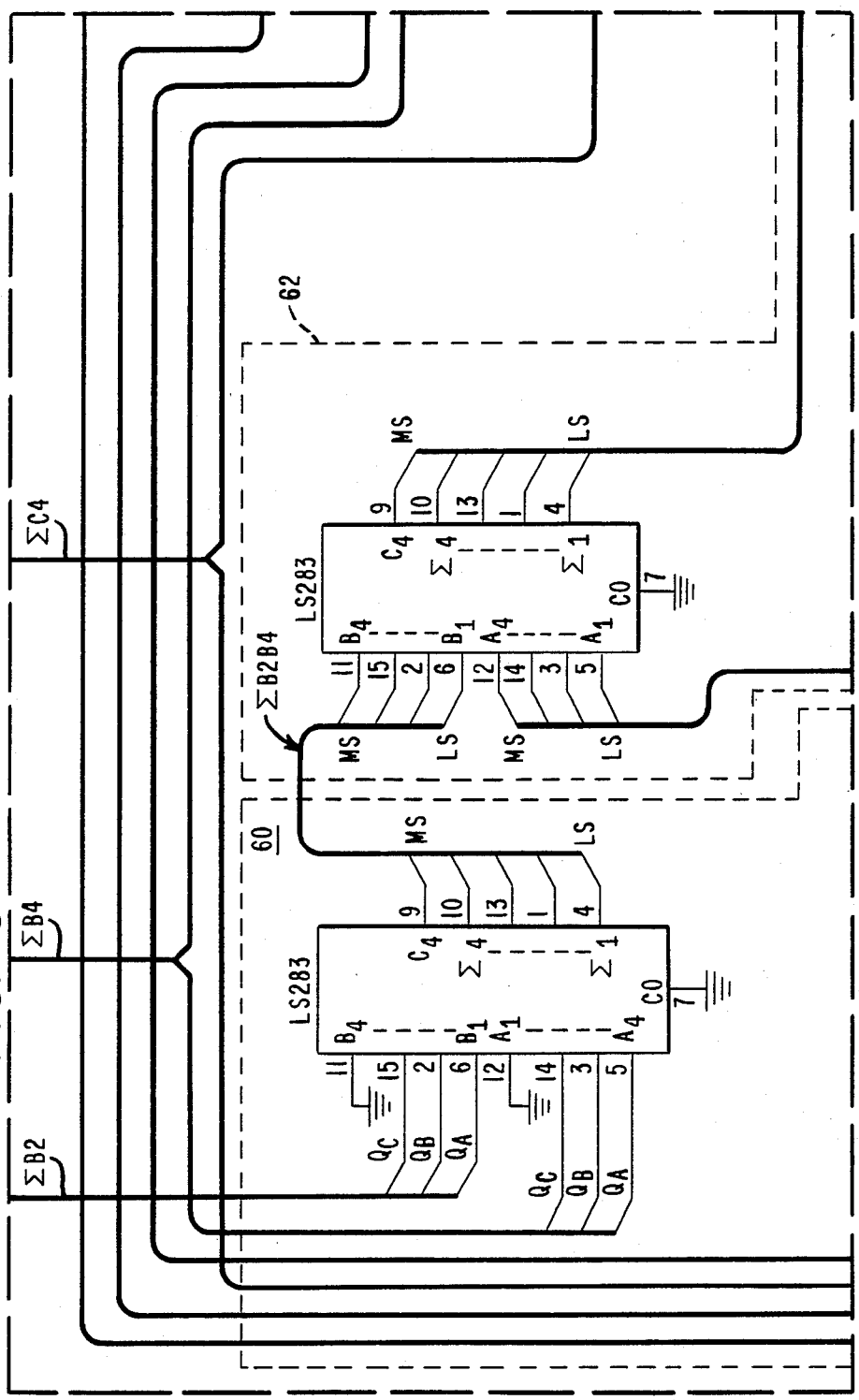

NOISE CLEANER FOR BINARY IMAGES

BACKGROUND OF THE INVENTION

The present invention is directed to the field of reading documents electronically and recreating the information read from the documents generally at a remote locality. More particularly, the present invention is directed to a device for removing noise from the binary signals that result from the scanning of documents such as bank checks. The present invention was designed as part of an automatic check processing system and has particular utility in automatic document processing systems such as facsimile and optical character recognition systems.

Images of documents contain many shades of gray called gray levels. Each gray level can be represented by a number called a gray value. In systems that process such signals as many as 64 gray levels are distinguished. In automatic document processing systems, gray levels are changed to numbers and a matrix of numbers is processed. In this matrix, each number of the matrix corresponds to the average gray value within a small square shaped area of the document. Each element is referred to as a "picture element" or a "pixel". In document processing, a matrix of gray values, where the number of gray levels is greater than 2, is called a "multi-gray level image" as compared to a "two-level" or "two-tone" image. For simplification, multi-gray level images are generally referred to as gray images, while the two-tone images are generally referred to as binary images. Binary images contain only the numbers 1 and 0 for black and white pixels, respectively.

The information appearing on, for example, most checks, is comprised of the legal and/or printed information along with the scenic background. This information can be represented by binary values where a 1 corresponds to a pixel covered by ink and a 0 corresponds to the pixel where there is little or no ink. In automatic document processing systems, it is desirable to use binary values rather than the gray image values because of the simplicity of handling 1's and 0's with computers. Such being the case, gray images are generally converted to binary images. During this process, called binarization, some pixels that do not belong to the 1 level are assigned a value of 1. This occurs because in addition to the legitimate information appearing on the checks, there is the background scene or pattern which can be as dark as the legal or desired information. The pixels in such dark areas are erroneously deemed black by the binarizer. These spurious black pixels are called noise. Additional causes of noise are, dirt on the paper, ink smudges, smears and the like. Noise has several detrimental effects on overall system performance in that it can often mislead computers and sometimes humans in their ability to recognize characters. It can also increase the amount of compressed image data by reducing the effectiveness of data compression algorithms. This in turn increases the space and cost associated with storing and transmitting the imaged data. And lastly, when the document is recreated on a visual screen, it strains the human eye during inspection due to the unclear images. Faced with the foregoing effects, it is highly desirable to process the binary images with a noise cleaning device after the binarization operation. Generally speaking, a noise cleaner should eliminate the noise as much as possible without impairing the legal and/or printed information. It should also be simple and be able to process the information quickly. There is a trade-off between the amount of noise that can be eliminated and the cost of the hardware for accomplishing the elimination. The present invention directs itself to providing a good noise cleaning performance while utilizing simple and fast hardware structures.

The following list of patents is indicative of the state of the art areas in which the invention resides:

U.S. Pat. No. 3,624,606 entitled, Data Connection System, by R. Lefevre;

U.S. Pat. No. 3,700,797 entitled, Facsimile Noise Deletion and Coding System, by R. E. Wernikoff;

U.S. Pat. No. 3,997,912 entitled, Method and Apparatus for Automatic Patterning Correction, by H. J. Zsagar;

U.S. Pat. No. 4,038,668 entitled, Apparatus for Producing Smooth and Continuous Graphic Displays from Intermittently Sampled Data, by W. T. Quarton; and U.S. Pat. No. 4,060,713 entitled, Analysis of Imager, by M. J. E. Golay.

SUMMARY OF THE INVENTION

In the preferred embodiment of the invention there is provided a 9×9 matrix of binary pixels (1's and 0's formed as rows and columns. The matrix is analyzed as concentric windows formed of interconnected rows and columns. Means are provided for logically combining the binary representation of the pixels for each of the positions in the first and second outermost rows and columns to form a first quantity. The binary representations of second outermost rows and columns (7×7 window) are logically combined with the binary representations in the third outermost rows and columns (5×5 window) to form a second quantity. Means are provided for logically combining the third outermost rows and columns with the innermost rows and columns (3×3 window) to form a third quantity. A numerical count of all of the pixels having a 1 level in the innermost and next-to-innermost rows and columns provides a first sum. All of the pixels having a 1 state in the second outermost rows and columns are summed with the first sum to provide a second sum. Means are provided for determining if the first quantity has a zero value and if so, if the second sum is less than a predetermined value. A clean signal generator is activated to clean the area of the 7×7 window if the condition is true, to eliminate all black (1) pixel representations in these areas. Logic means are provided for determining if the second quantity has a zero value and if simultaneously, the first sum is less than a predetermined value. If both conditions exist, means are activated for energizing the clean signal generator to clear the 5×5 window of black pixels. If the third quantity is equal to zero, means are activated for cleaning the area corresponding to the innermost 3×3 window of black pixels.

From the foregoing, it can be seen that it is a primary object of the present invention to provide an improved noise cleaner for a binary signal process.

It is another object of the present invention to provide a noise cleaner based upon the condition of signals within an area of interest.

These and other objects of the present invention will become more apparent when taken in conjunction with the following description and drawings, wherein like characters indicate like parts and which drawings form a part of the present specification.

BRIEF DESCRIPTION OF THE DRAWINGS

FIGS. 5A–5J illustrate in logic schematic level form a first portion of the preferred embodiment disclosed in FIG. 4.

DESCRIPTION OF THE PREFERRED EMBODIMENT

Figures 1, 2:
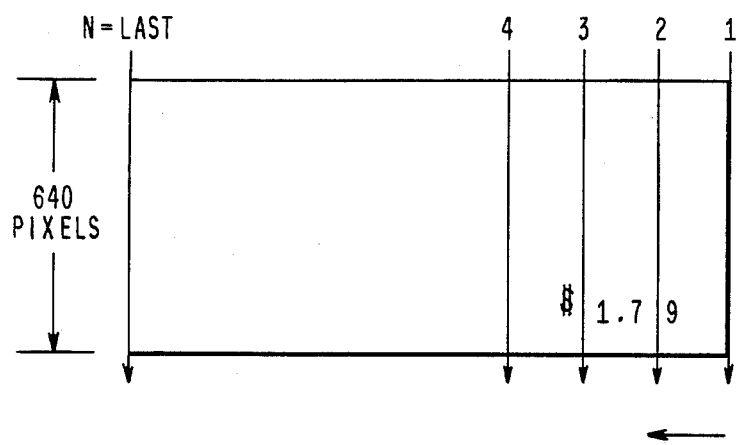
FIG. 1 is a schematic representation of the scanning of a document such as a check.
FIG. 2 is a representation of a 9×9 matrix of binary pixels.
Figure 3:
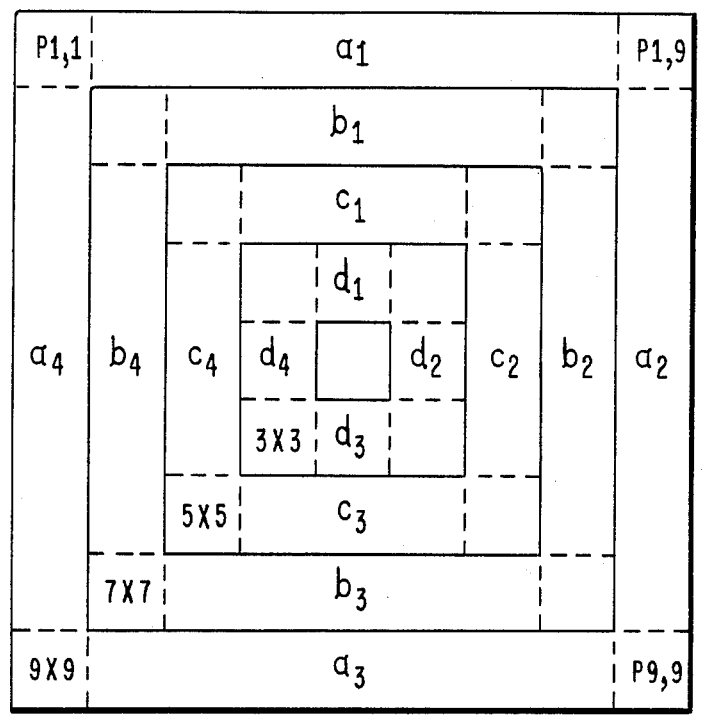
FIG. 3 is a diagram illustrating windows corresponding to the 9×9 matrix shown in FIG. 2.
Figure 6:
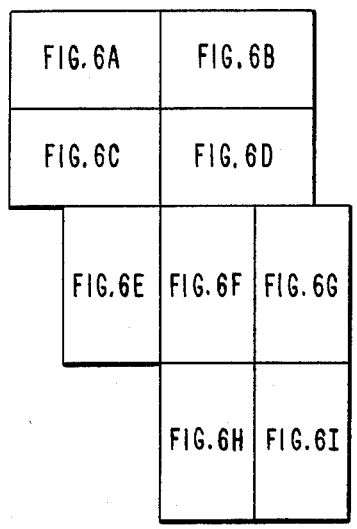
FIG. 6 is an interconnection map for the drawings of FIGS. 6A to 6I inclusive.
Figure 4:
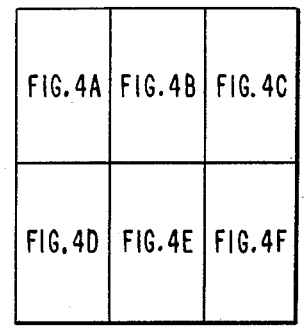
FIG. 4 is an interconnection map for the drawings of FIGS. 4A to 4F inclusive.
Figure 7:
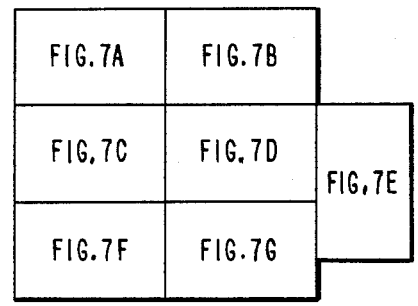
FIG. 7 is an interconnection map for the drawings of FIGS. 7A to 7G inclusive.

Referring to FIG. 1, a document such as a check is shown being scanned by scan lines 1 to N as the check traverses the scan position. Each scan line results in 640 pixels being generated. The scan lines are one pixel in width and are spaced one pixel apart. As the document is scanned, the presence of a dark spot (ink spot, printing etc.) creates a black pixel. The absence of a printing or dark spot creates a white pixel. The black pixel has a binary value of 1 and a white pixel has a binary value of 0. The pixels are stored in a 9×9 matrix configuration as shown by the example of FIG. 2. Obviously, as the document is scanned, the pixels comprising the 9×9 matrix change as a function of the scan rate. For purposes of understanding the invention, FIG. 2 is a snapshot in time of the contents of the 9×9 matrix. Referring now to FIG. 3, wherein a plurality of windows are shown, corresponding to the rows and columns of the 9×9 matrix of FIG. 2. For example, the row labeled $a_1$ consists of the pixels $P_{11}$–$P_{19}$ and the column $a_2$ consists of the pixels $P_{19}$–$P_{99}$. Each of the rectangular blocks overlaps at the ends with its connecting block. All of the like lettered rectangles are connected together to form a frame, that is, four concentric square frames extending outwards from a central pixel defined as $P_{55}$.

The operation of the noise cleaner can best be understood by first understanding the mathematics associated with the circuit. The following discussion attempts to accomplish this point.

Area A: 9×9 window. a1,a3 are 1×9 and a2,a4 are 9×1 windows within A

Area B: 7×7 window. b1,b3 are 1×7 and b2,b4 are 7×1 windows within B

Area C: 5×5 window. c1,c3 are 1×5 and c2,c4 are 5×1 windows within C

Area D: 3×3 window. d1,d3 are 1×3 and d2,d4 are 3×1 windows within D $\Sigma A1$ equals the number of black pixels within the window a1, $\Sigma A2$ equals the number of black pixels within the window a2, etc.

Na1 equals 0 if $\Sigma A1=0$, and, Na1 equals 1 if $\Sigma A1 \neq 0$,
Na2 equals 0 if $\Sigma A2=0$, and, Na2 equals 1 if $\Sigma A2 \neq 0$, etc.

We define certain variables as follows:

$$AB = Na1.Nb1 + Na2.Nb2 + Na3.Nb3 + Na4.Nb4 \quad \text{Eq. 1}$$

$$BC = Nb1.Nc1 + Nb2.Nc2 + Nb3.Nc3 + Nb4.Nc4 \quad \text{Eq. 2}$$

$$CD = Nc1.Nd1 + Nc2.Nd2 + Nc3.Nd3 + Nc4.Nd4 \quad \text{Eq. 3}$$

wherein the (.) defines the Boolean "AND" operation and the (+) denotes the Boolean "OR" operation.

$$SUM1 = \Sigma C1 + \Sigma C2 + \Sigma C3 + \Sigma C4 + \Sigma D1 + \Sigma D2 + \Sigma D3 + \Sigma D4 \quad \text{Eq. 4}$$

$$SUM2 = SUM1 + \Sigma B1 + \Sigma B2 + \Sigma B3 + \Sigma B4 \quad \text{Eq. 5}$$

where
(+) defines the arithmetic operation.
SUM1 represents the sum of all the black pixels in C1, C2, C3, C4, D1, D2, D3, and D4.
SUM2 represents the sum of all the black pixels in B1, . . ., D3, and D4.

The logic of the noise cleaner is as follows:
If AB=0 and SUM2<K2 then clean area B (7×7 window)
If BC=0 and SUM1<K1 then clean area C (5×5 window)
If DC=0 then clean area D (3×3 window).

The values for K1 and K2 are selected based on the desired result. In the preferred embodiment of the invention K1 was 20 and K2 was 22.

If AB=0 then any object within area B is completely isolated from all the objects outside the 9×9 window (area A). The same logic holds for BC=0 and DC=0. SUM1 and SUM2 are computed and checked to see if there are more than K1 or K2 black pixels within area C or B respectively. If there are, then areas C and B are almost filled with black pixels and yet may be isolated from other objects. In this case, areas C and B are not cleaned to prevent elimination of square symbols between the MICR characters on checks.

Referring now to FIGS. 4A–4F, a 9×9 computing matrix 10 is shown comprised of eight 640-bit delay lines 12A–12H; nine shift registers, 14A–14D, 15A, B, 16A, B, and 17; logic blocks 19, 21 and six 4 bit counters 20. Each shift register except for 14D provides an input to an associative delay line and receives as an input the output of each preceding delay line. Shift register 14A receives as its input the input data signal DATAB. The signal $\overline{DATAB}$ is the system input signal representing the binary valued pixels read from a document. The signal is applied to an inverter 18 and is inverted to provide the data signal DATAB. Shift register 14D receives as its input the signal from delay line 12H and provides its output to a logic block 21. The output signal from logic block 21 is the signal Na2. Clocking is set in each of the shift registers 14, 15, 16 and 17 by means of a clocking signal CK2. A reset is provided by a reset signal labeled $\overline{RESET}$. The output of shift register 14A is directed to a logic block 19, the output of which is the signal Na4. The six 4 bit counters and counter logic circuit 20 receives the output signals from shift registers 14B, 15A, 16A, 16B, 15B and 14C. The outputs from each of the six counters and control logic 20 are the signals representative of the quantities ΣB4 and Nb4 for the stage associated with register 14B. And in a like manner, the remaining five output pairs are as indicated. An input into the six 4-bit counters 20 is the clocking signal CK4 and an initializing signal $\overline{\text{INIT}}$. Shift register 17 does not have its output directed to the six 4-bit counters. It is a 1 bit shift register, the output of which is directed to the next succeeding delay line segment 12E. The signal $\overline{\text{WE}}$ is applied as a clocking input to the delay lines 2A, 12B, 12C, . . . , 12H. The eight-640-bit delay lines 12 store the eight most recent scan lines in order to permit the forming of the 9-pixel×9-pixel computing matrix. The 9-shift register coupled to the delay lines complete the forming of the 9×9 computing matrix.

A circuit for the row sum signals is shown as element 50 receiving its inputs from the nine outputs of the shift registers 14A-D, 15A, 15B, 16A, 16B and 17. These inputs are summed by the summing circuit 52 to provide four sets of outputs, one each of which is directed to a three bit shift register 54A, a five bit shift register 54B, a seven bit shift register 54C, and a nine bit shift register 54D. Each of the aforementioned shift registers is clocked with a clocking signal CK4 and is resettable with a resetting signal labeled $\overline{\text{RESET}}$. The outputs of shift registers 54 are directed to the inputs of the summation circuits 56A, 56B and 56C. Each of the summing circuits 56A-56C provides the product sum of the signals applied to its inputs along with the individual signals, such as for example, in 56A the summer provides the signal ΣD1D3 along with the signals Nd1 and Nd3. The 9 bit shift register 54D provides at its output the signals Na1 and Na3.

The summation circuit 60 receives the summation signals ΣB2, ΣB4, ΣC2, ΣC4, ΣD2 and ΣD4, and sums those signals to form three output signals ΣB2B4, ΣC2C4, and ΣD2D4 which are directed as summing inputs to a summing circuit 62. Additional inputs to the summing circuit 62 are the sum ΣB1B3; ΣC1C3 and ΣD1D3 appearing at the output of summing circuits 56. These inputs are summed to form two output sums labeled ΣCD which is equal to SUM1 and ΣBCD which is equal to SUM2 shown in equations 4 and 5, respectively. Two 6 bit magnitude comparators 64 receive the two sum signals, SUM1 and SUM2 and compare the magnitude of each of these signals against a respective constant. A constant generator 65 provides the constant $K_1$. A constant generator 66 provides the constant $K_2$. The output signals from the magnitude comparators 64 are a function of whether the magnitude of the constants is exceeded or is not exceeded. The output signals are directed to a twice retime circuit 68. The first retime is necessary because of the large delays caused by the address and logic circuits. The second retime is required so as to be in phase with $\overline{\text{AB}}$, $\overline{\text{BC}}$ and $\overline{\text{CD}}$. The first retime is clocked by CK4 and the second retime is clocked by CK2. Additional inputs to the retiming circuits are the reset signal RESET and the clocking signals CK2 and CK4. If the SUM1 signal is less than the signal constant $K_1$, an activation signal is sent to a decision logic 70. In like manner if SUM2 is less than the constant $K_2$, an activation signal is sent to the decision logic 70. Decision logic 70 also receives as inputs the clocking signal CK3 and the logic AND/OR signals $\overline{\text{CD}}$, $\overline{\text{BC}}$ and $\overline{\text{AB}}$ generated by a logic AND/OR circuit 72. Circuit 72 receives as individual inputs the row signals Na1-Na4, Nb1-Nb4, Nc1-Nc4 and Nd1-Nd4 from computing matrix 10 and 50. The signals are logically AND/ORed together in accordance with the aforementioned formulas and are directed to the twice retime circuit 74. The retiming circuit receives as its inputs the reset signal RESET and the clocking signal CK2. The first retime, for this circuit, is necessary because of the large delays caused by the adder and logic circuits. The second retime is required so as to be in the same time slot as SUM1 and SUM2. Both retimes are clocked by CK2. The decision logic 70 observes the states of the signals at its input and provides outputs in accordance with the formulas if AB=0 and the SUM2 is less than the constant $K_2$, there is a clean activation signal directed to the clean signal generator 76 for Area B (7×7). In addition, if BC=0 and SUM1 is less than the constant $K_1$, a clean activation signal is also sent to the clean signal generator 76 for Area C (5×5). Additionally, if CD=0, another activation signal is directed to the clean signal generator 76 for Area D (3×3). Generator 76 is resettable by the reset signal $\overline{\text{RESET}}$. The outputs of the clean signal generator are the clean-the-area B signal CLNB, the clean-the-area C signal CLNC, and the clean-the-area D signal CLND. These signals are directed to a 7×7 modifying matrix 80. A 9 bit delay line 84 receiving the clocking signals CK2 and the reset signal $\overline{\text{RESET}}$ has its input connected to the output labeled B on the 9 bit shift register 14A. This 9 bit delay line 84 directs its output to a 7×634 bit delay line 82. The delay line additionally receives 7 inputs which constitute the outputs of the 7×7 matrix such that all of the 641 bits can be shifted through the modifying matrix 80. The 634 bit delay line receives the enabling signal $\overline{\text{WE}}$ at one of its inputs to step the contents of the matrix as a function of the signals generated by an address counter 86. The address counter receives as one of its inputs the enabling signal $\overline{\text{WE}}$ and the initiate signal INIT. In addition, the modifying matrix is clocked by the CK2 signal. The delay line 82 and matrix 80 store the seven most recent scan lines of the image in order to form the 7×7 matrix. The matrix represents a 7-pixel by 7-pixel area of the image which is modified by the clean signals derived from the row and column sum computations. Data that has been noise cleaned is outputted from the modifying matrix 80 to a retiming circuit 92 which is clocked by the CK2 signal and reset with the reset signal $\overline{\text{RESET}}$. The noise cleaned data is then directed to an inverter 94 and outputted to the remainder of a data system as the signal $\overline{\text{DATAN}}$.

Timing is accomplished with the timing generator 100 which receives as its inputs the data valid signal DVALB and a reset signal $\overline{\text{RESET}}$ and $\overline{\text{CLK}}$. The timing generator provides at its outputs the necessary clocking and synchronizing signals. A MODULUS 640 address counter 110 receives as inputs the enabling signal $\overline{\text{WE}}$ and the internal initiate signal $\overline{\text{INIT}}$. The outputs A0 and A3 of the counter are directed to a detect-count-9 circuit 112. The detect-count-9 circuit receives as an additional input the clocking signal CK3. When a 9 count is detected, an enabling signal is directed to a latch and retime circuit 116. The retiming circuit 116 receives as inputs the clock signal $\overline{\text{CLK}}$ and the reset signal $\overline{\text{RESET}}$. The output of the latch and retime circuit 116 is directed to another retime circuit 124 which receives as its inputs the clock signal $\overline{\text{CLK}}$ and the clock signals CK1 and CK2 as ORed together in an ORing circuit 122. The output of the retime circuit 124 is directed to an inverting circuit 128 to provide the output signal data valid $\overline{\text{DVALN}}$.

Figure 5:
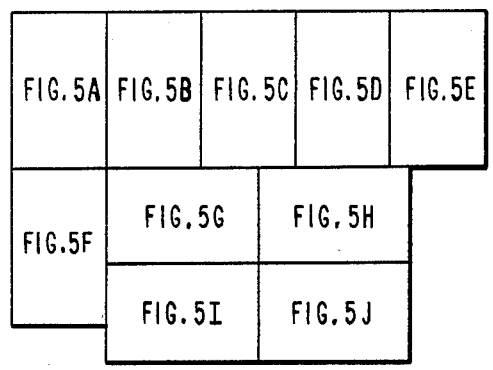
FIG. 5 is an interconnection map for the drawings of FIGS. 5A to 5J.
Figure 4A:
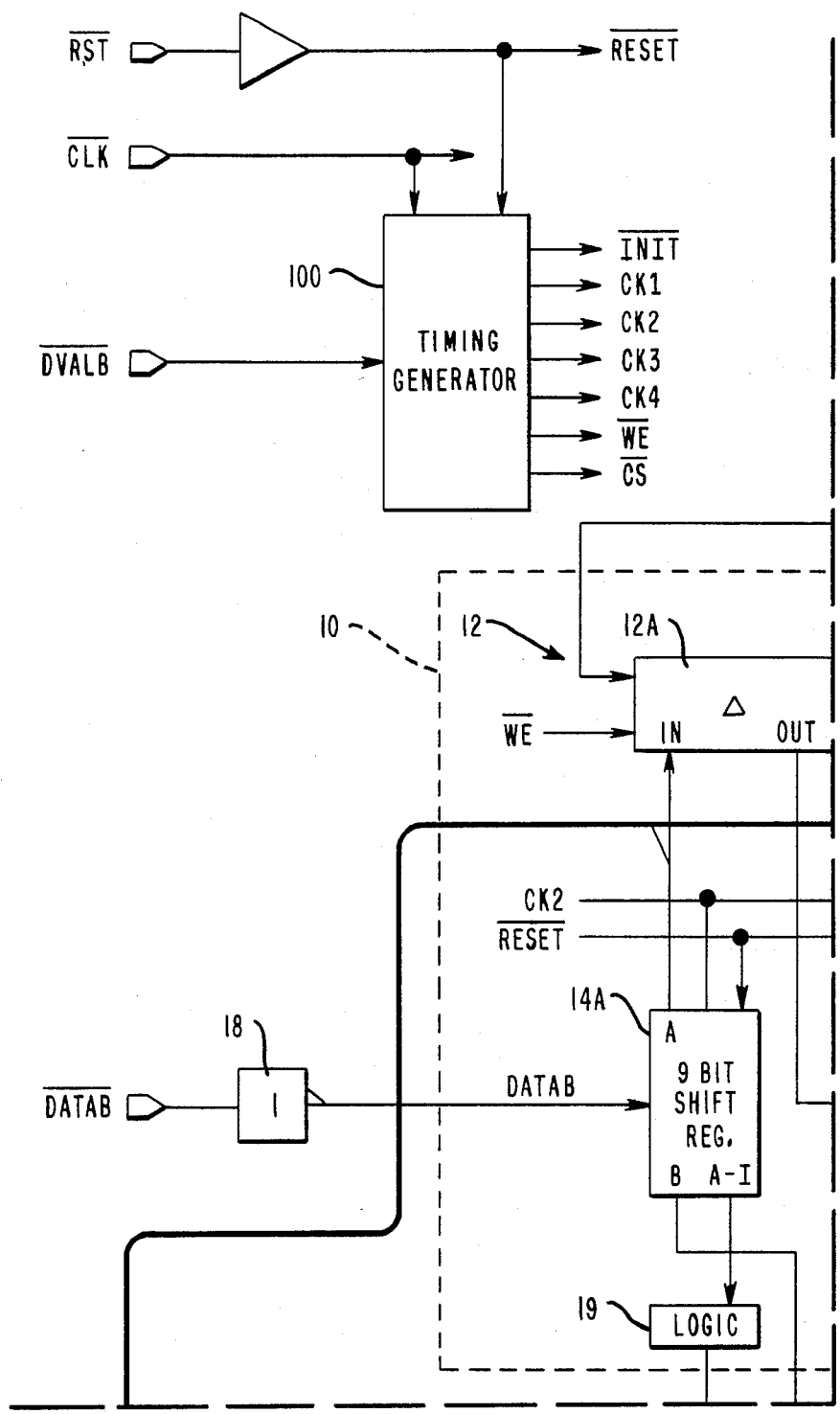
FIGS. 4A–4F illustrate in block diagram form the preferred embodiment of the invention.
Figure 4B:
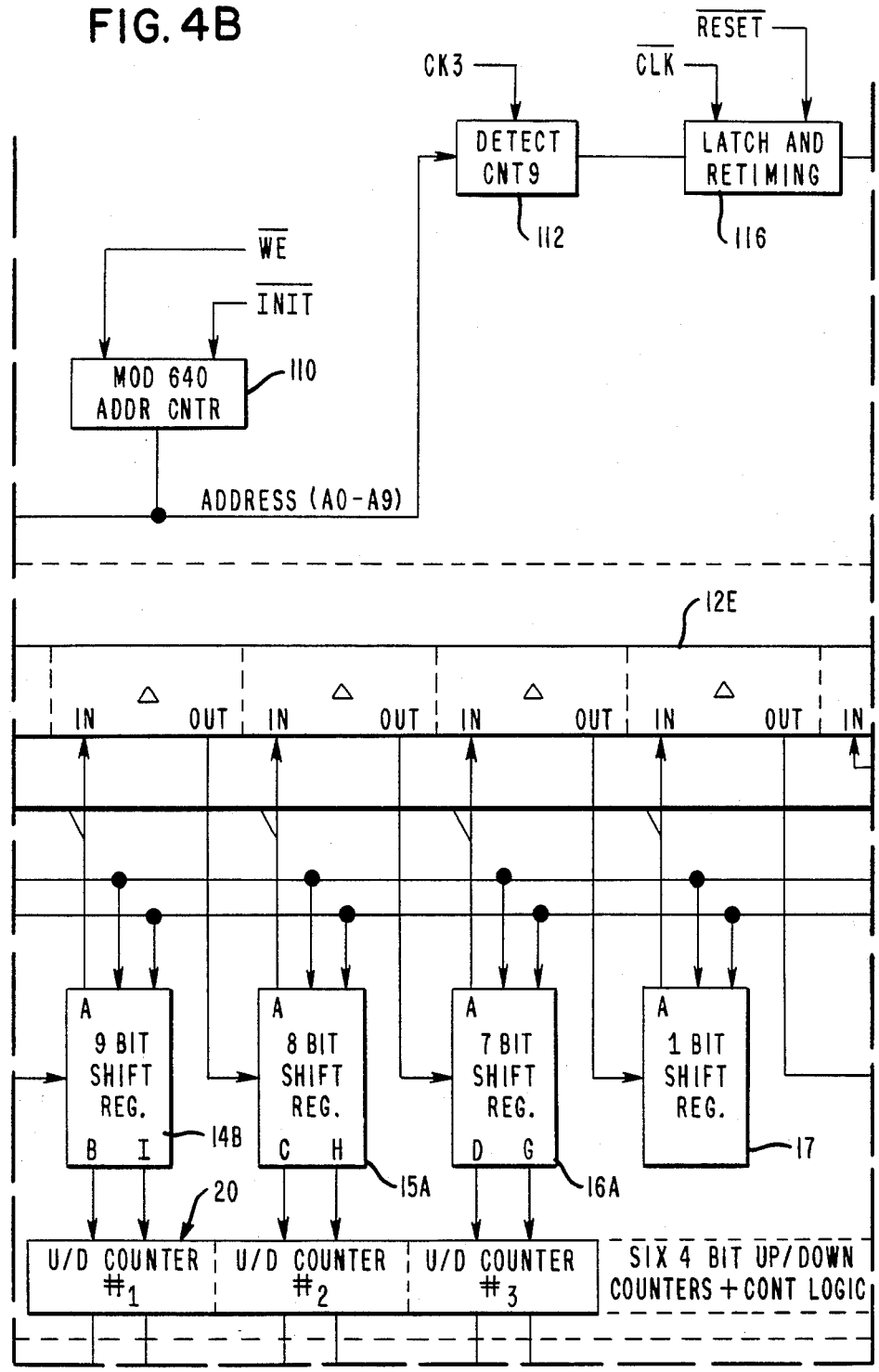
Figure 4C:
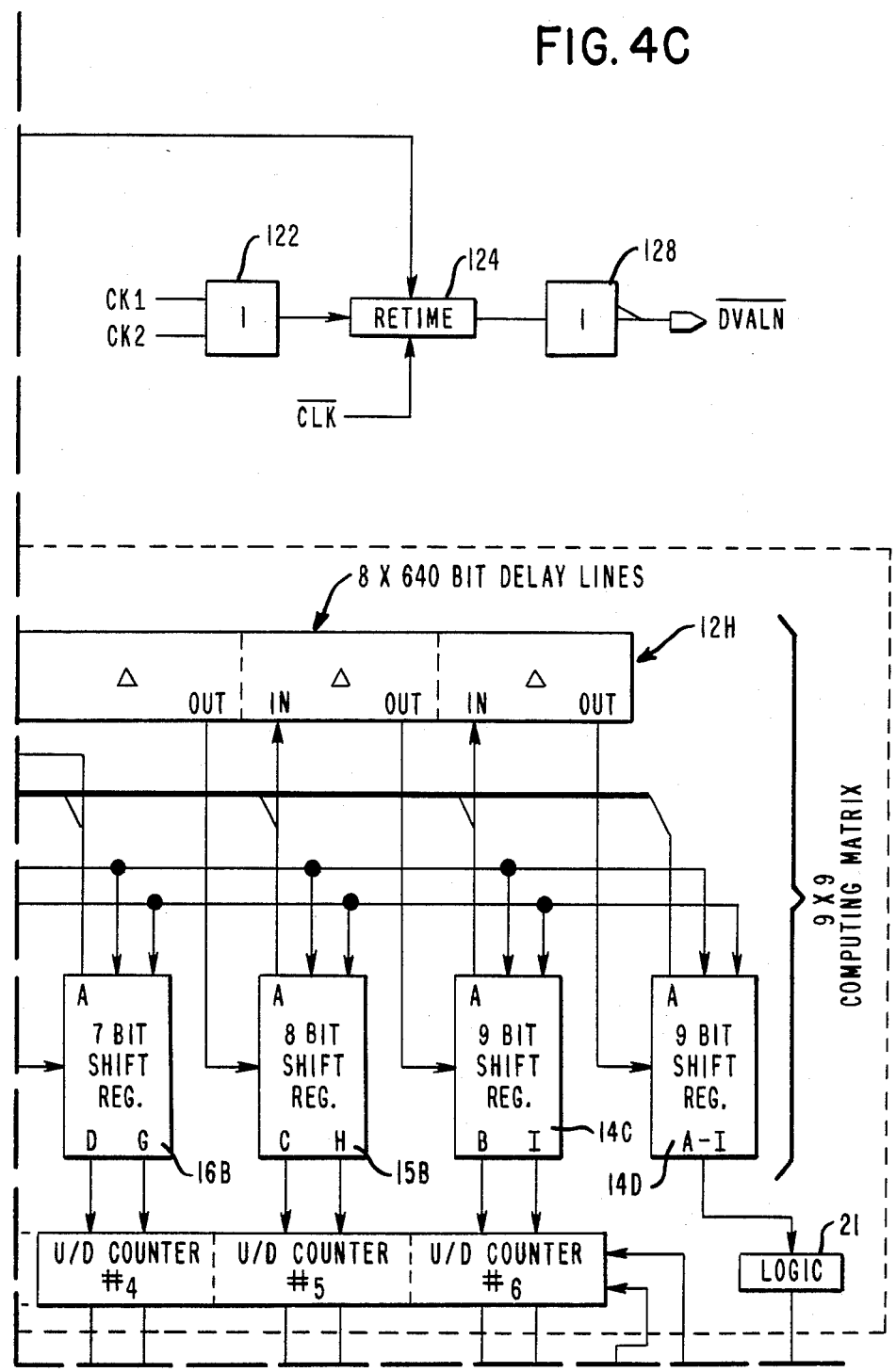
Figure 4D:
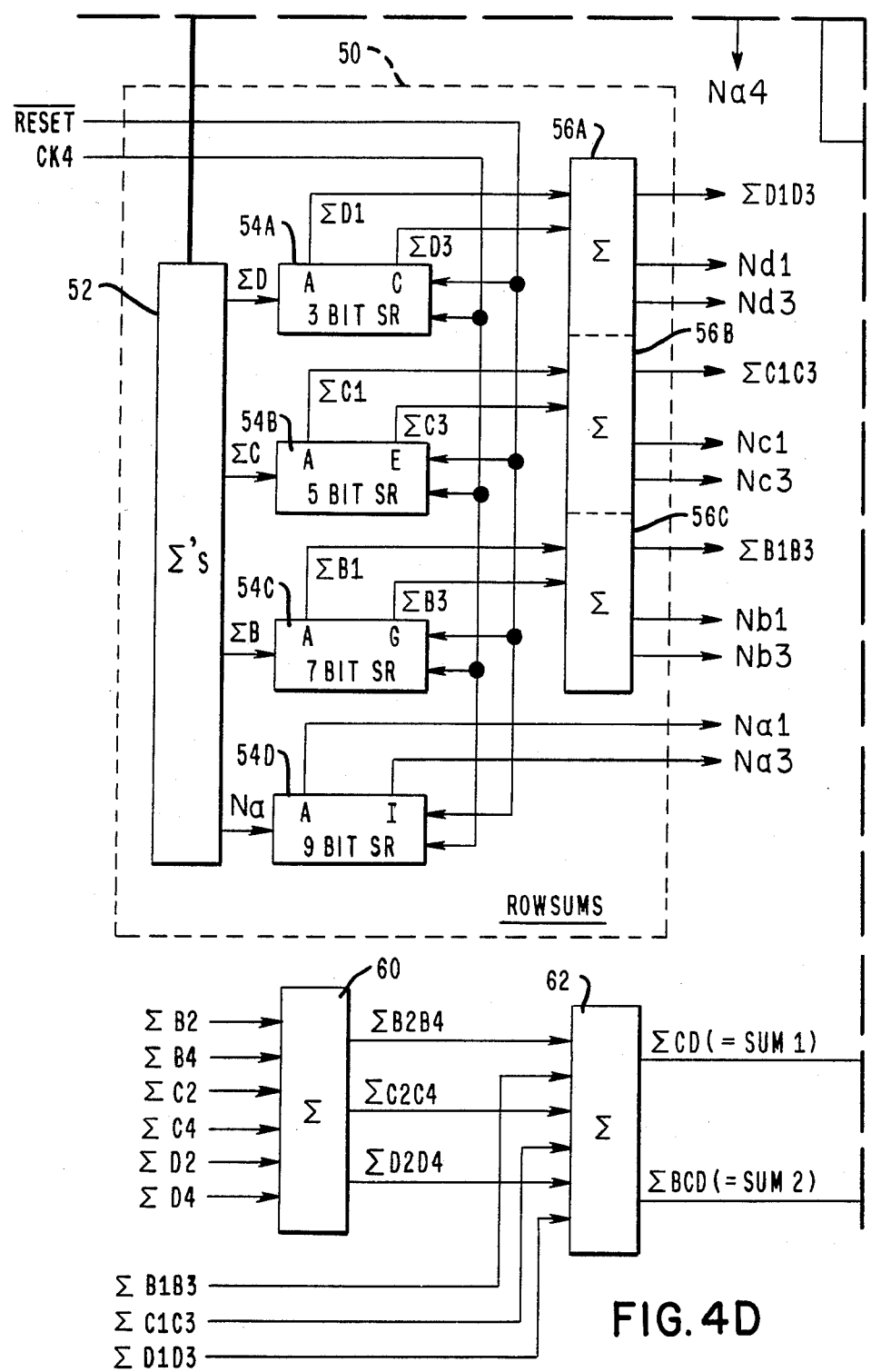
Figure 4E:
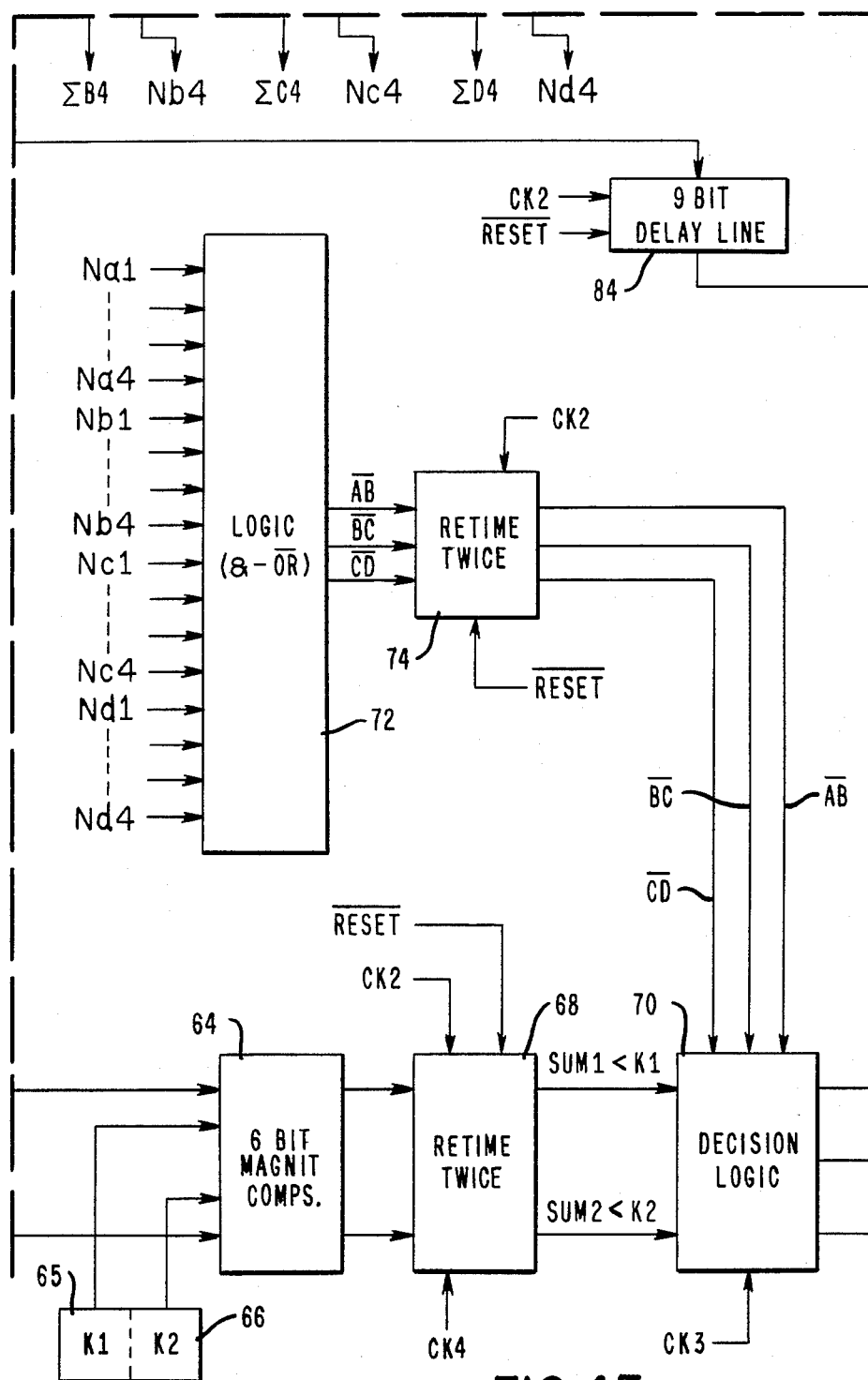
Figure 4F:
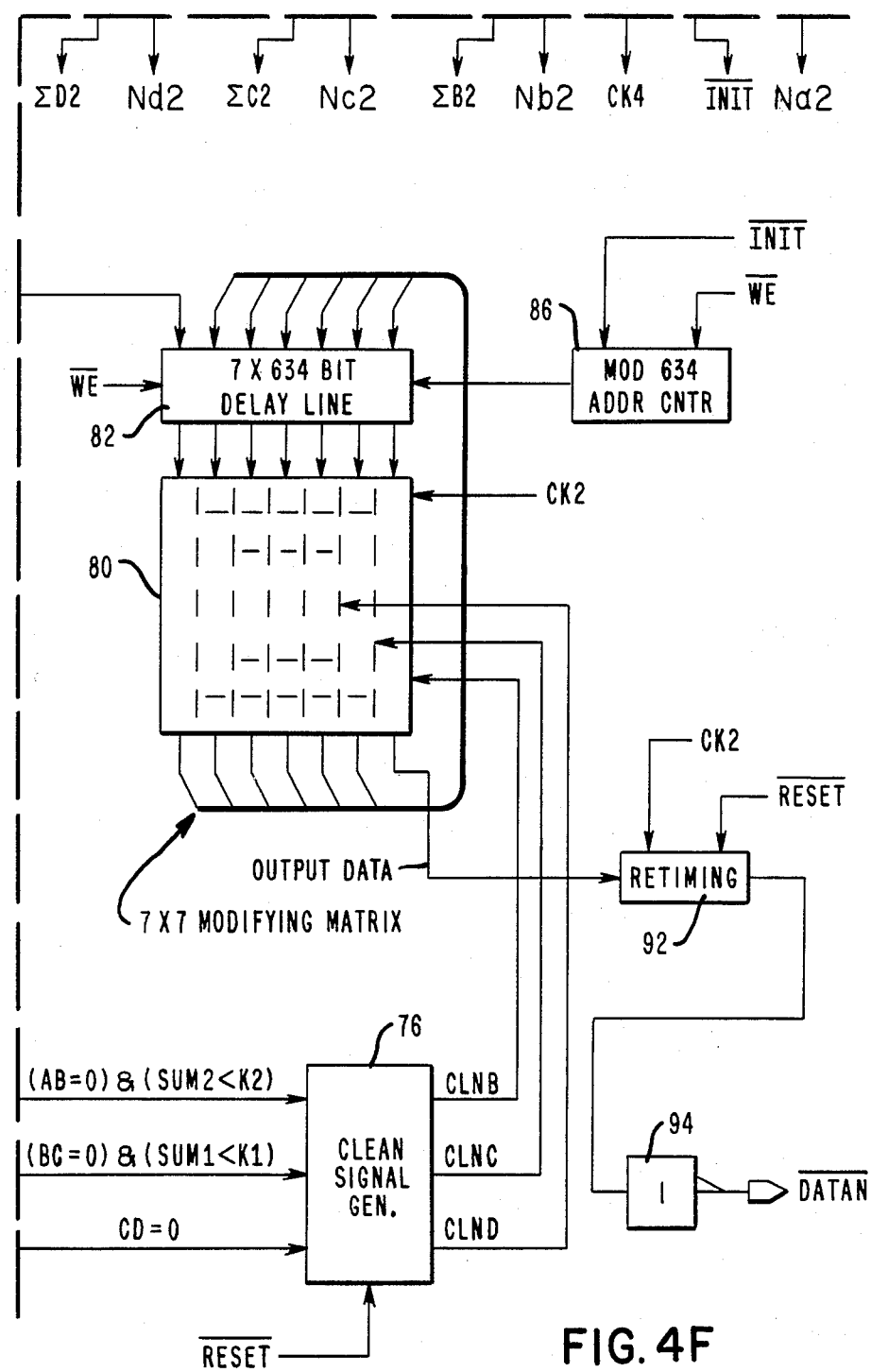
Figure 5A:
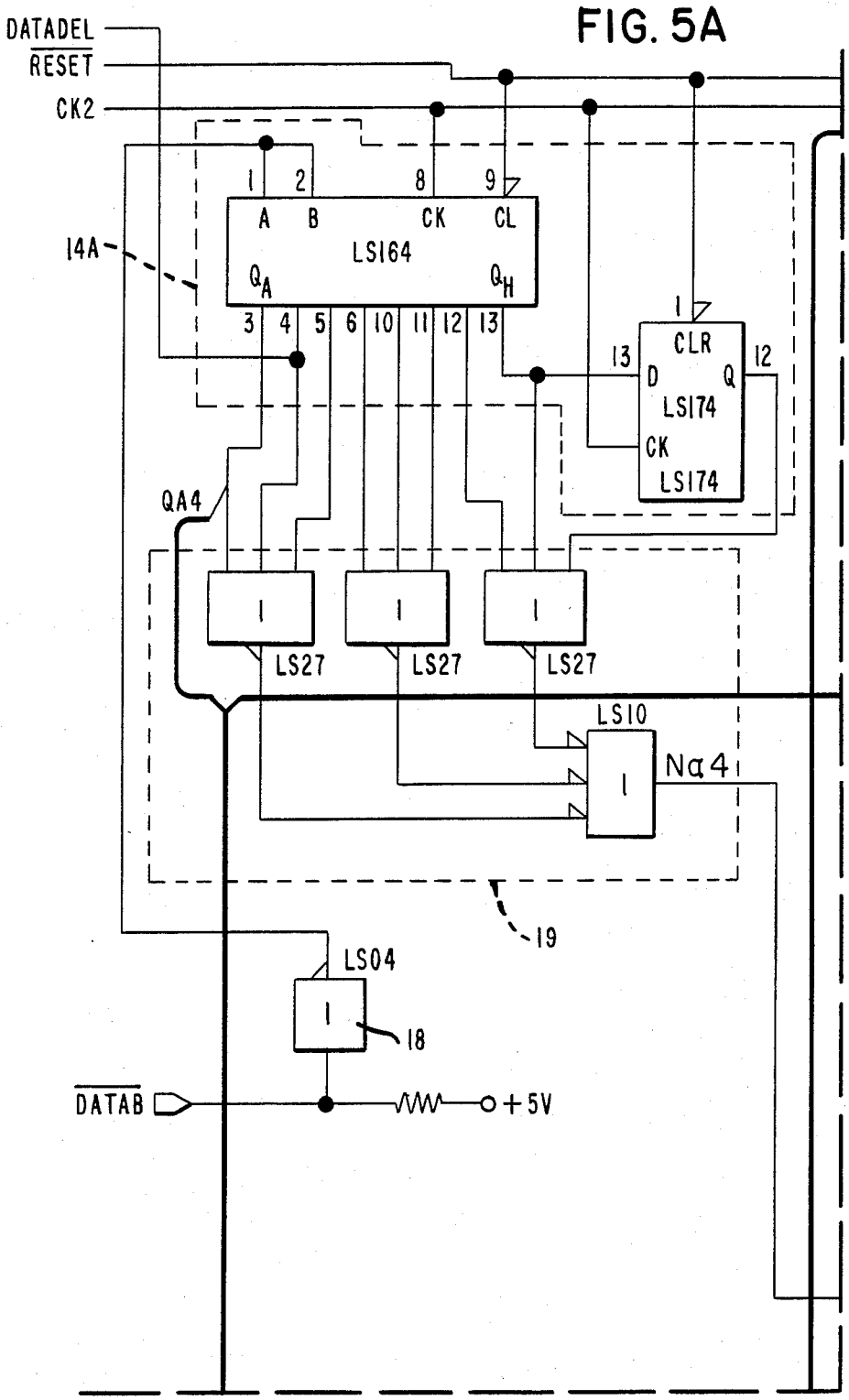
Figure 5B:
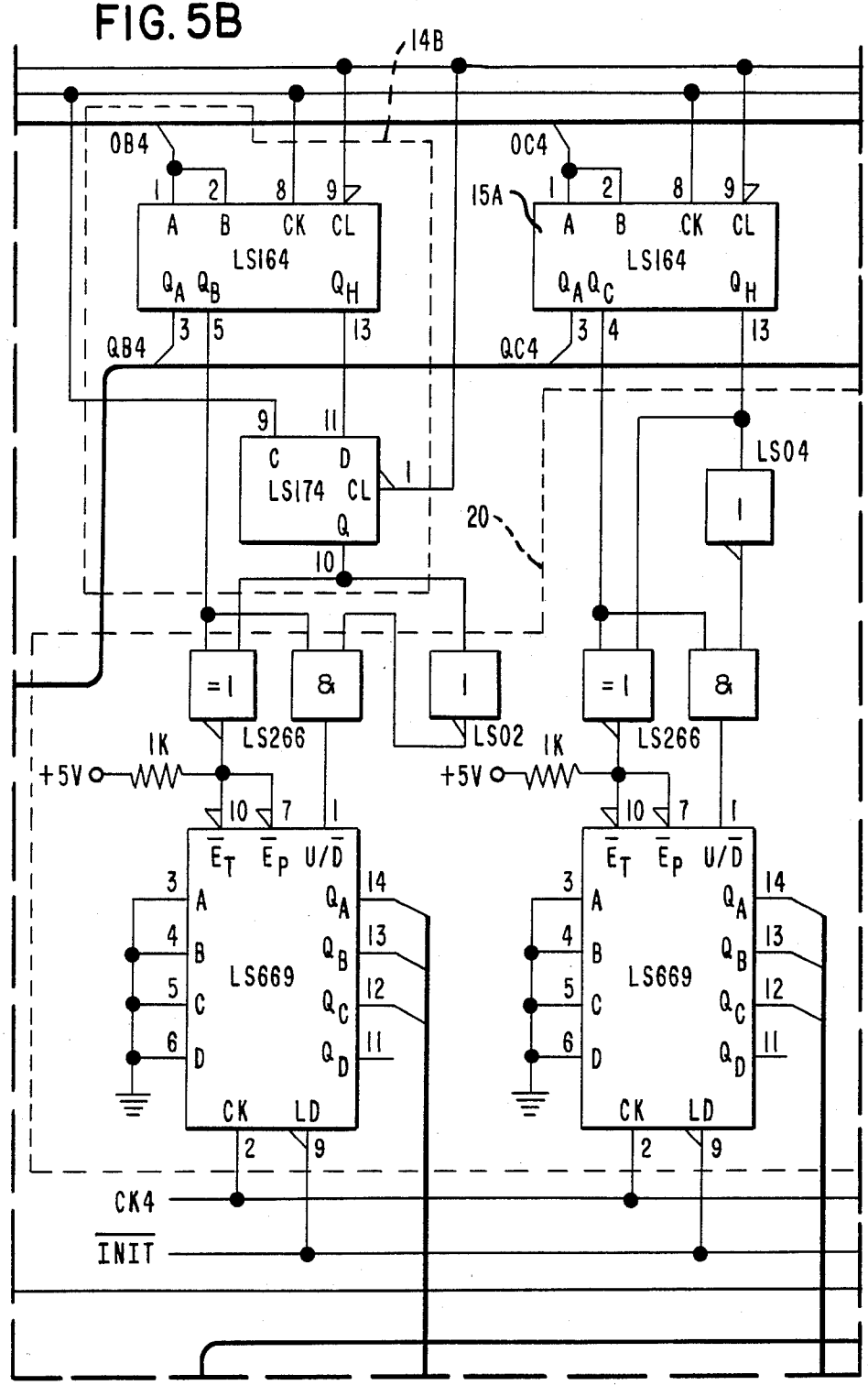
Figure 5C:
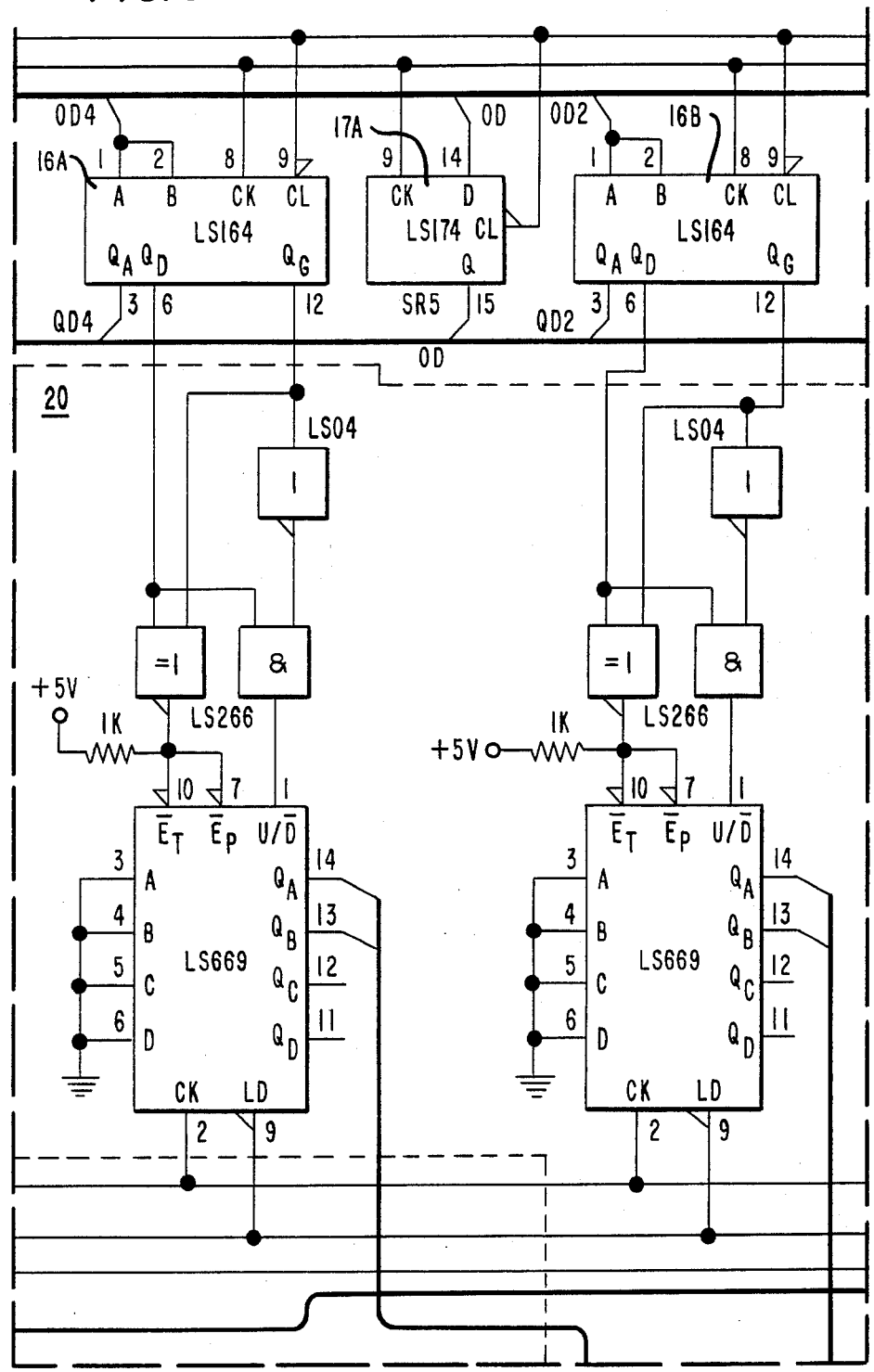
Figure 5D:
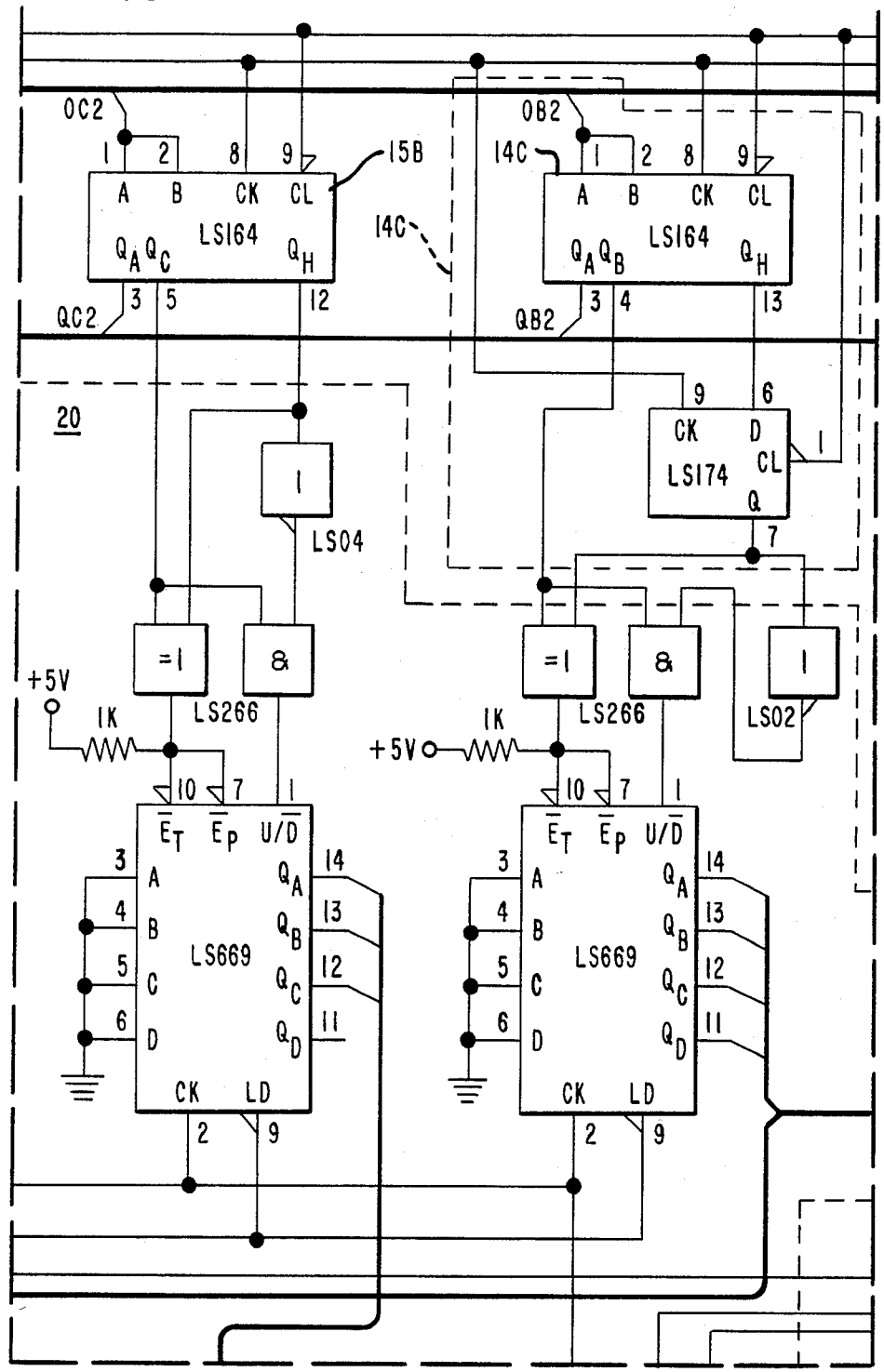
Figure 5E:
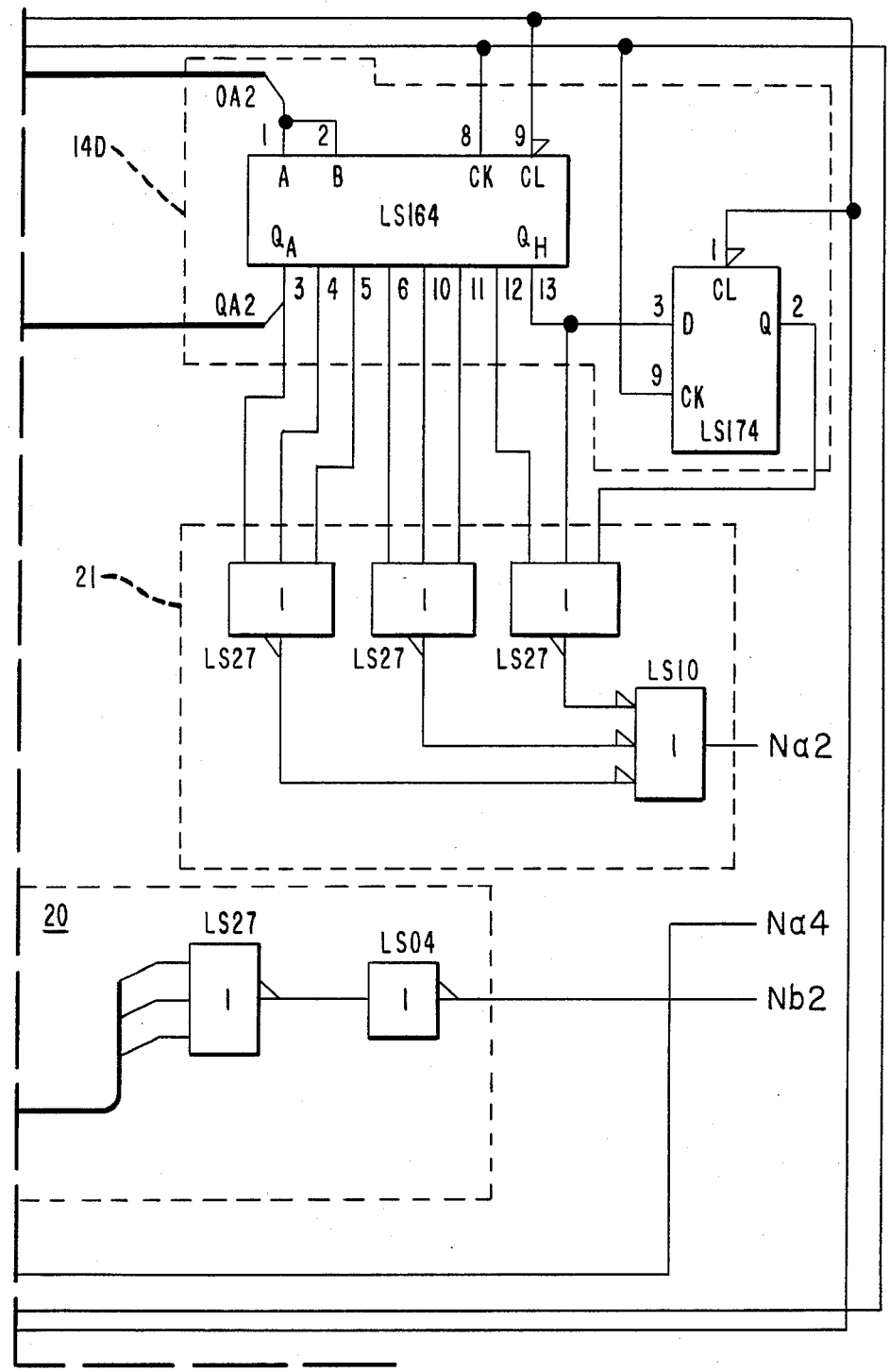
Figure 5F:
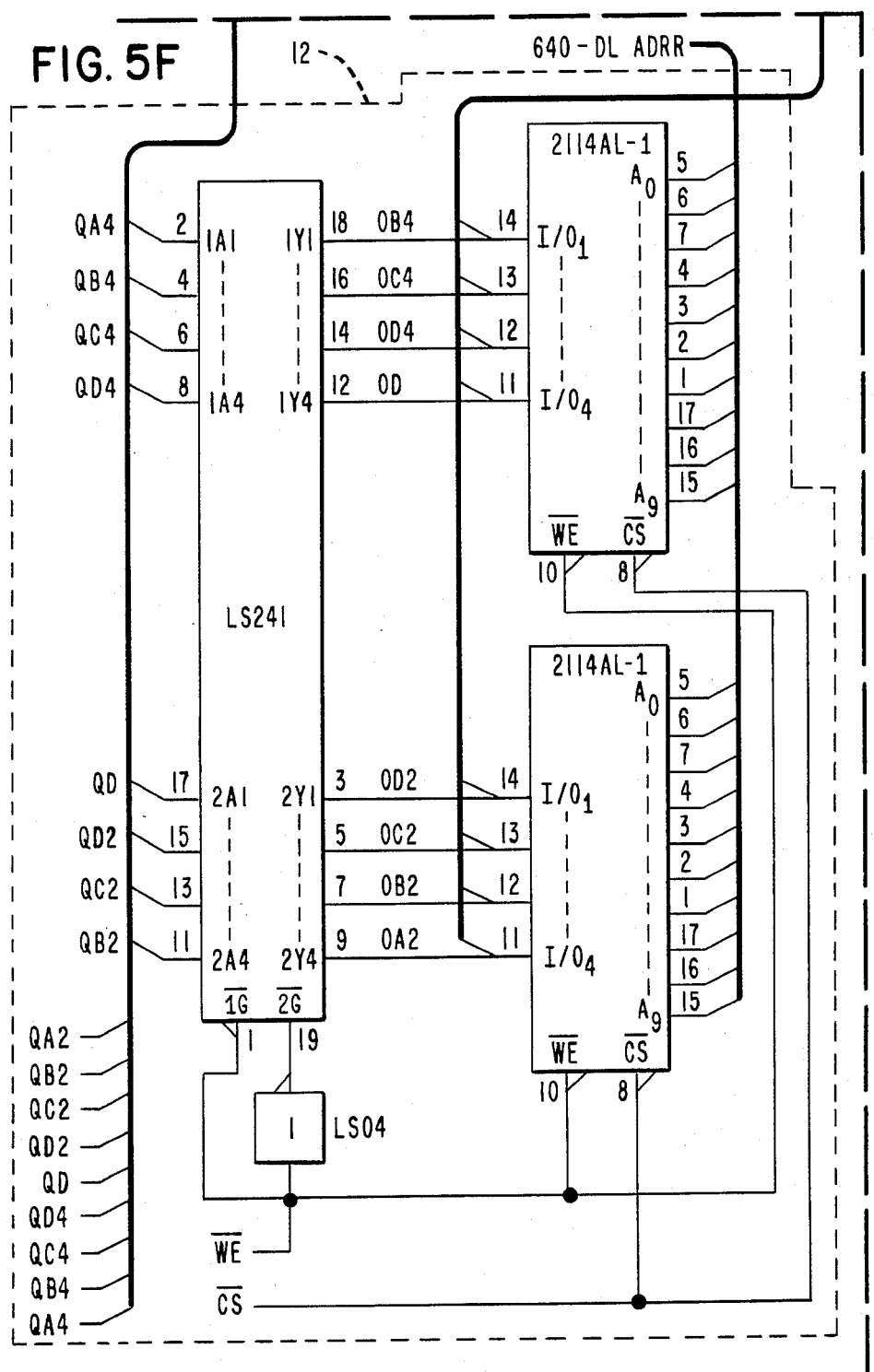
Figure 5H:
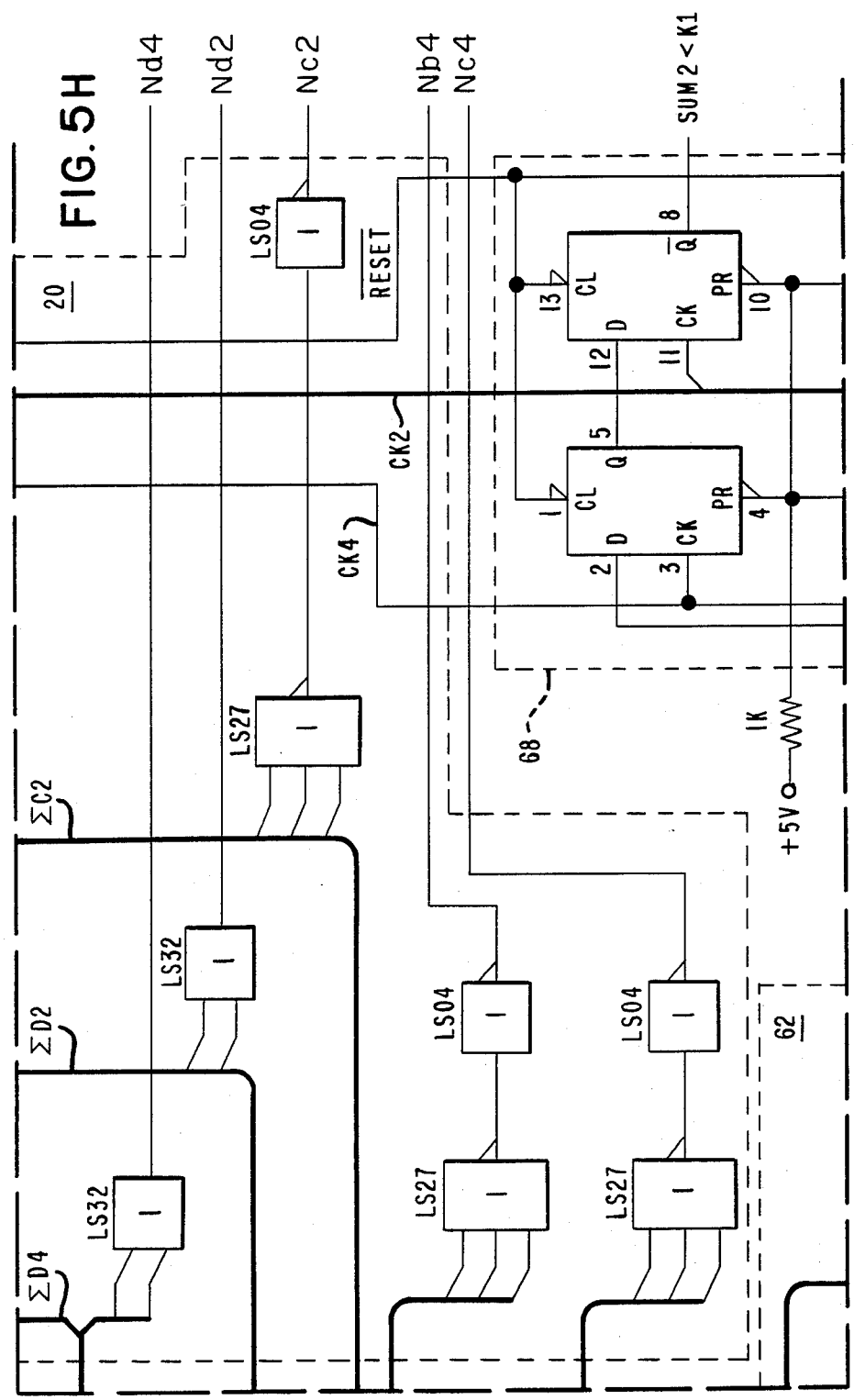
Figure 5I:
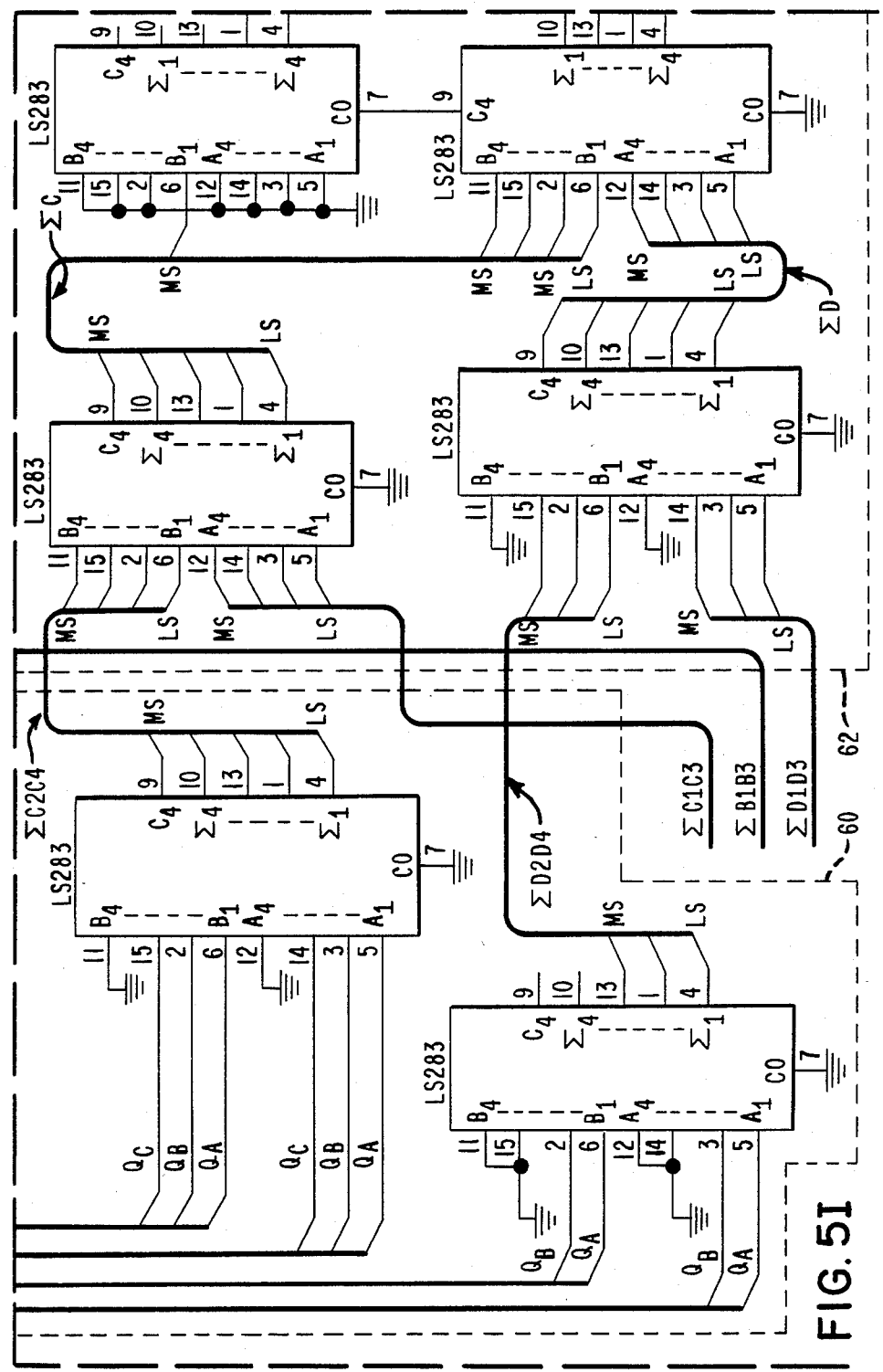
Figure 5J:
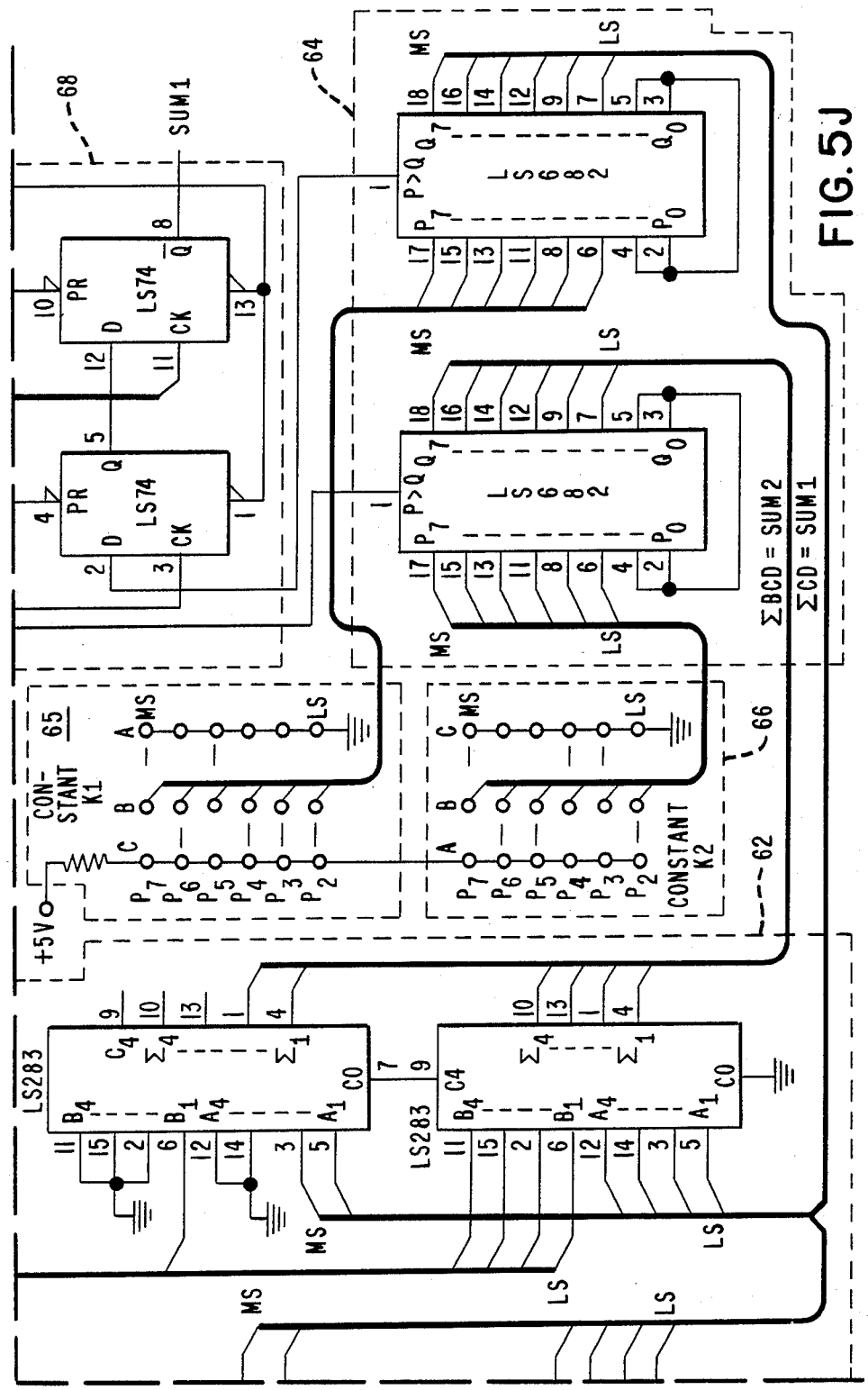
Figure 6A:
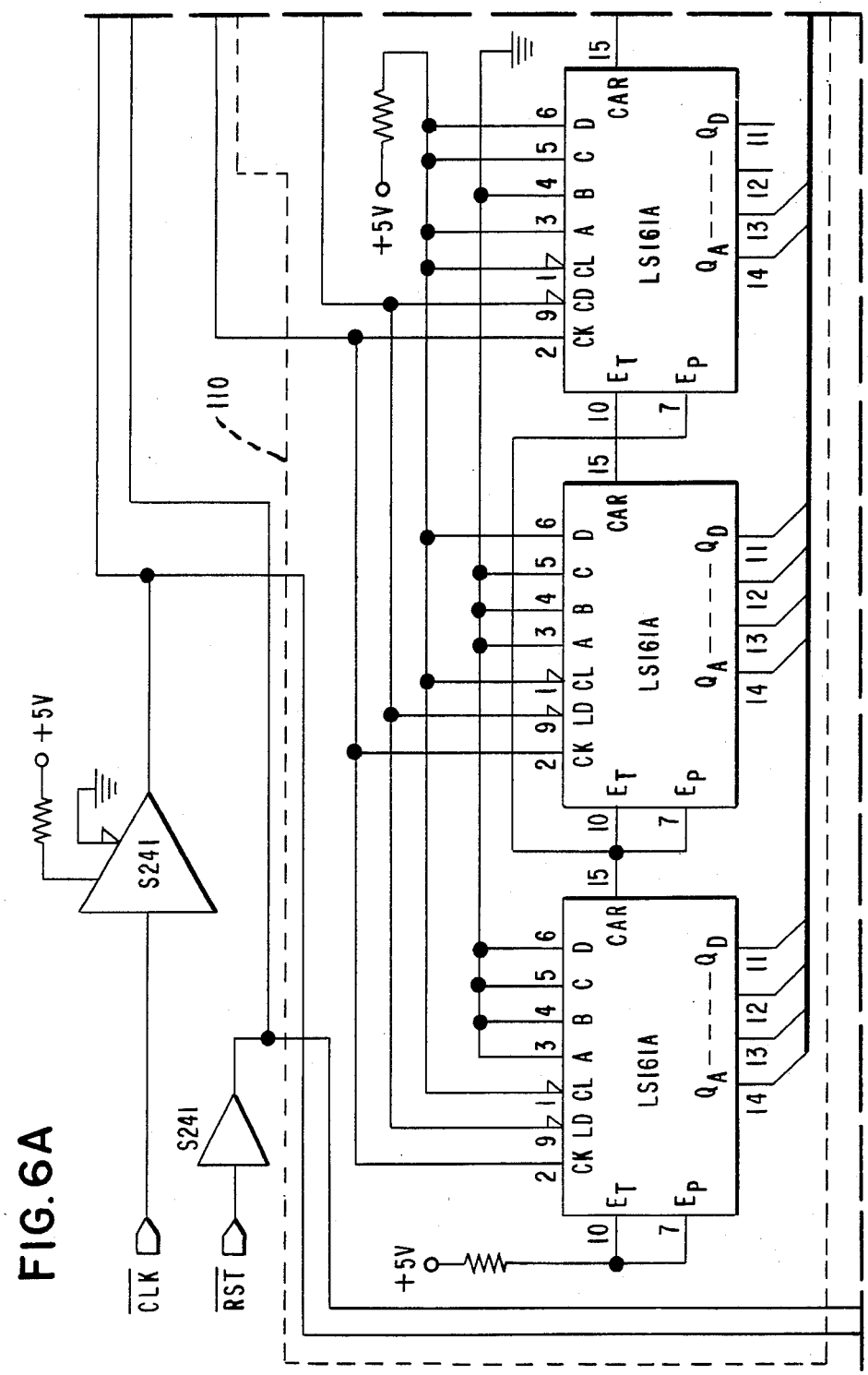
FIGS. 6A–6I illustrate in logic level schematic form a second portion of the embodiment illustrated in FIG. 4.
Figure 6B:
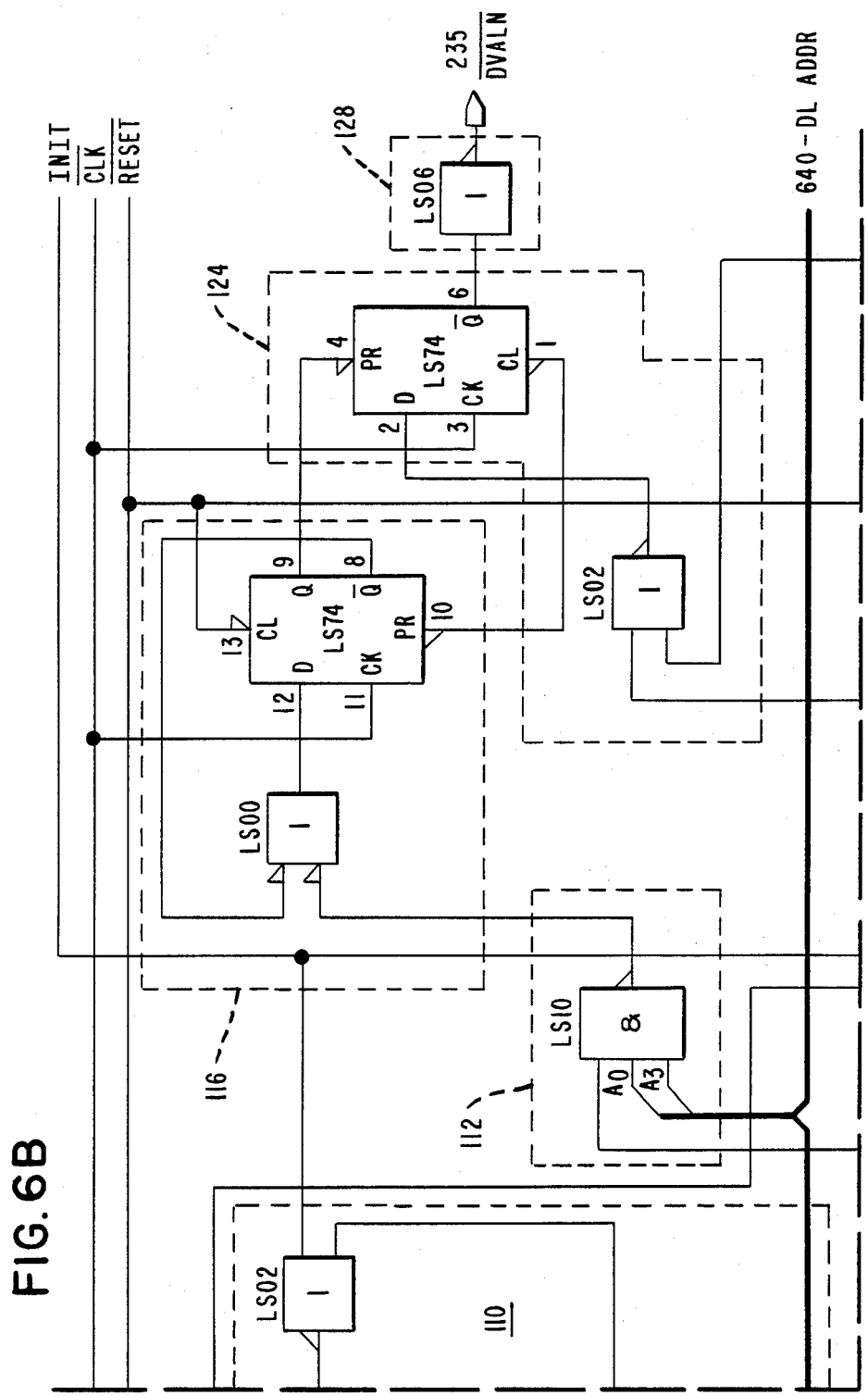
Figure 6C:
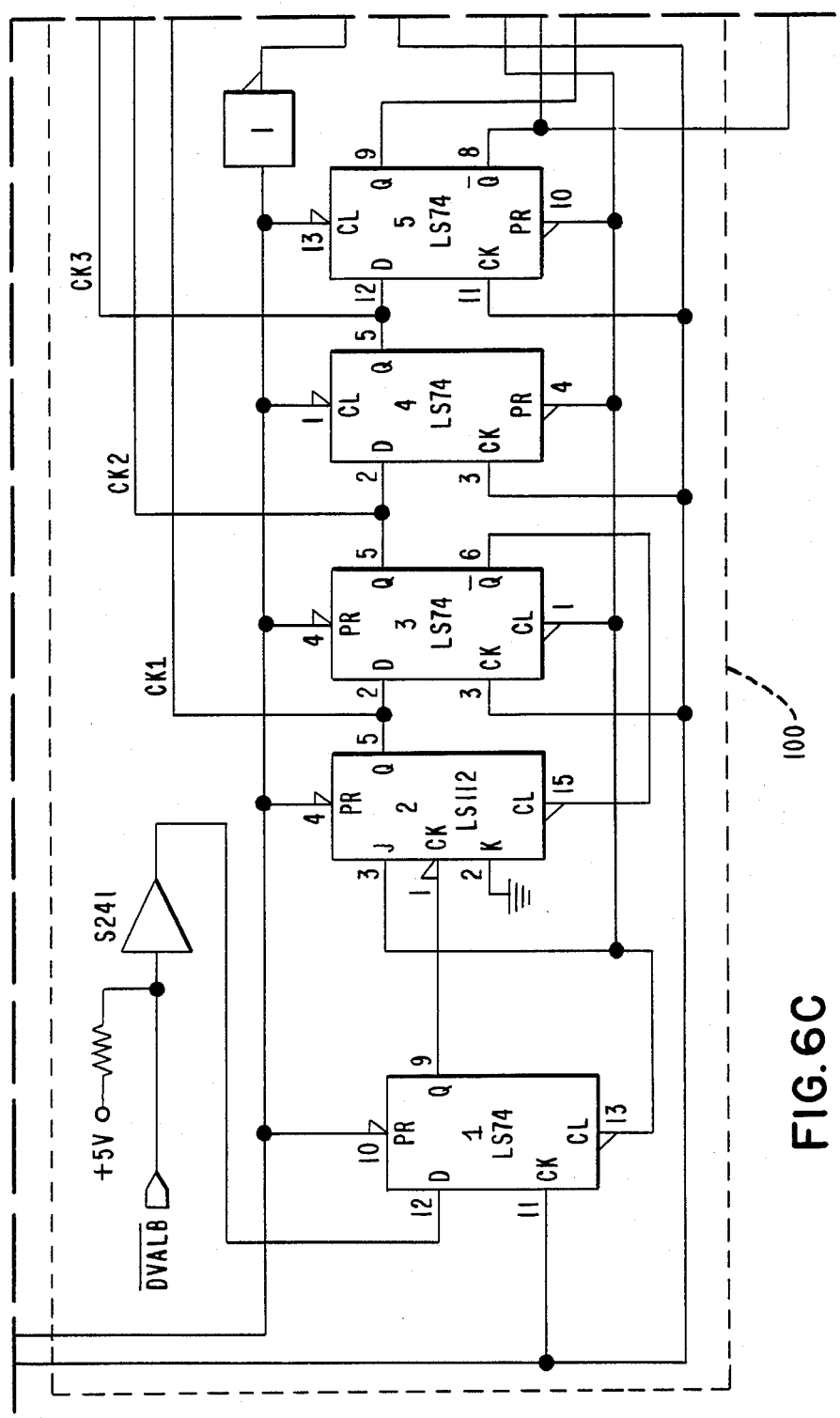
Figure 6D:
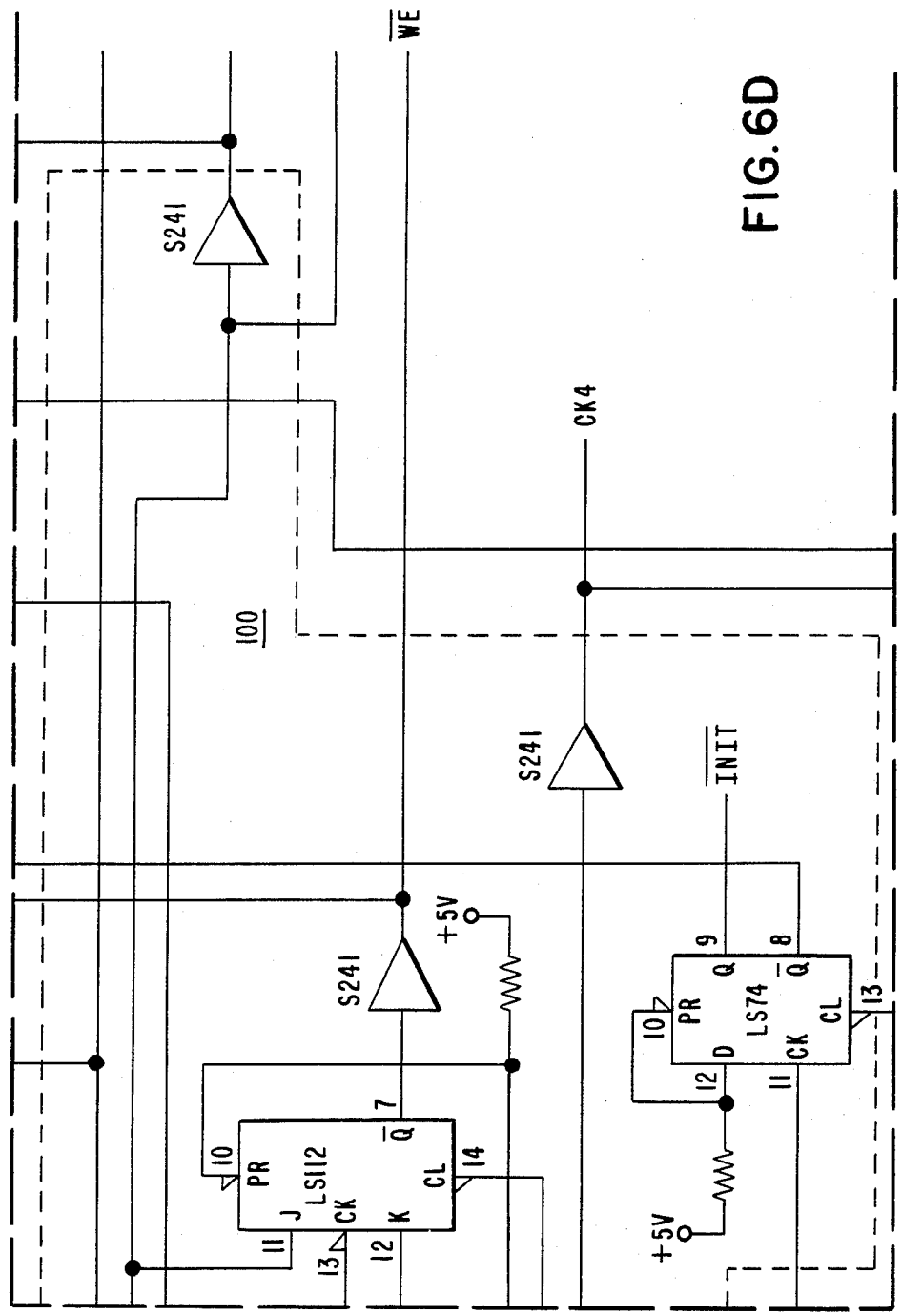
Figure 6E:
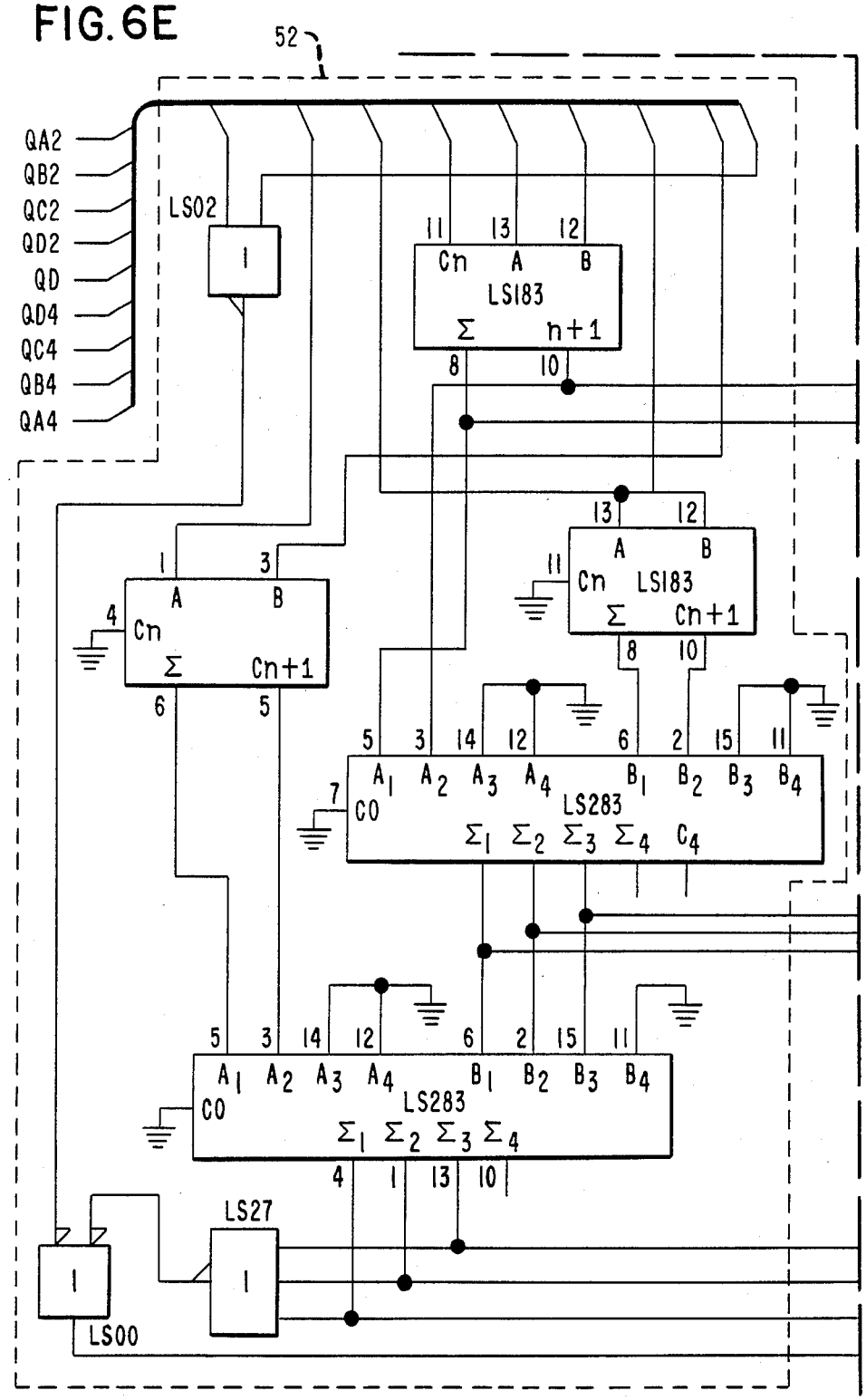
Figure 6F:
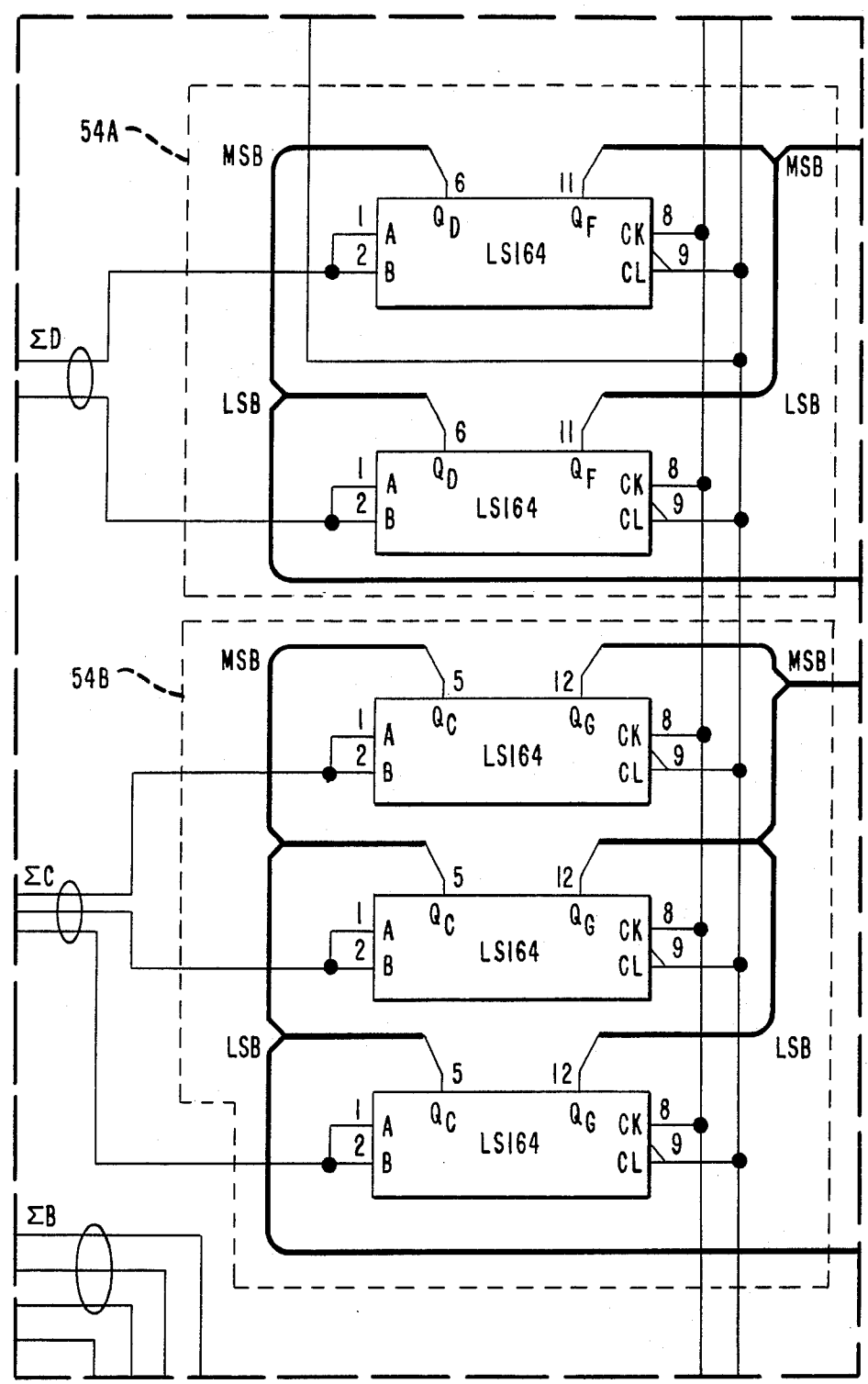
Figure 6G:
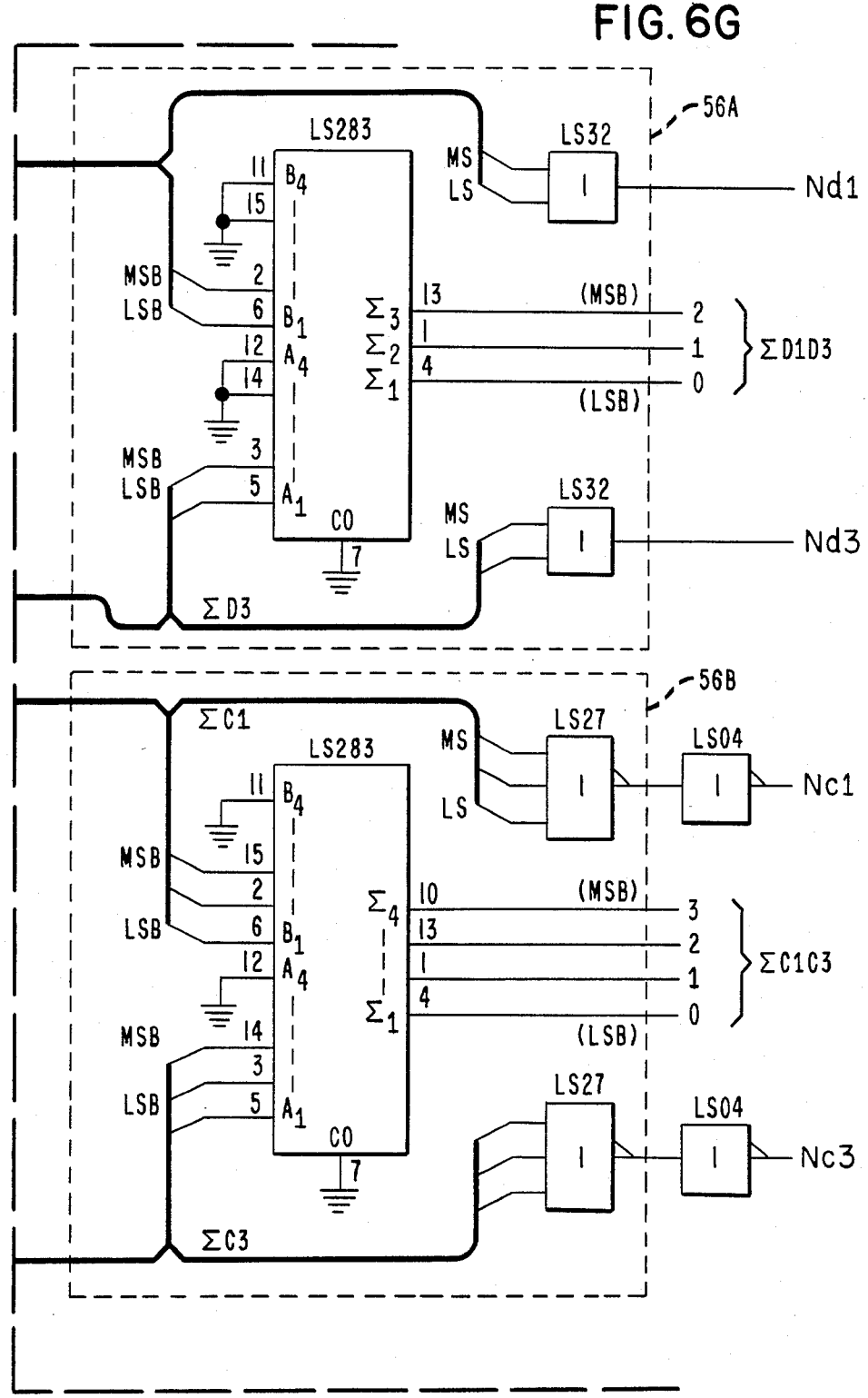
Figure 6H:
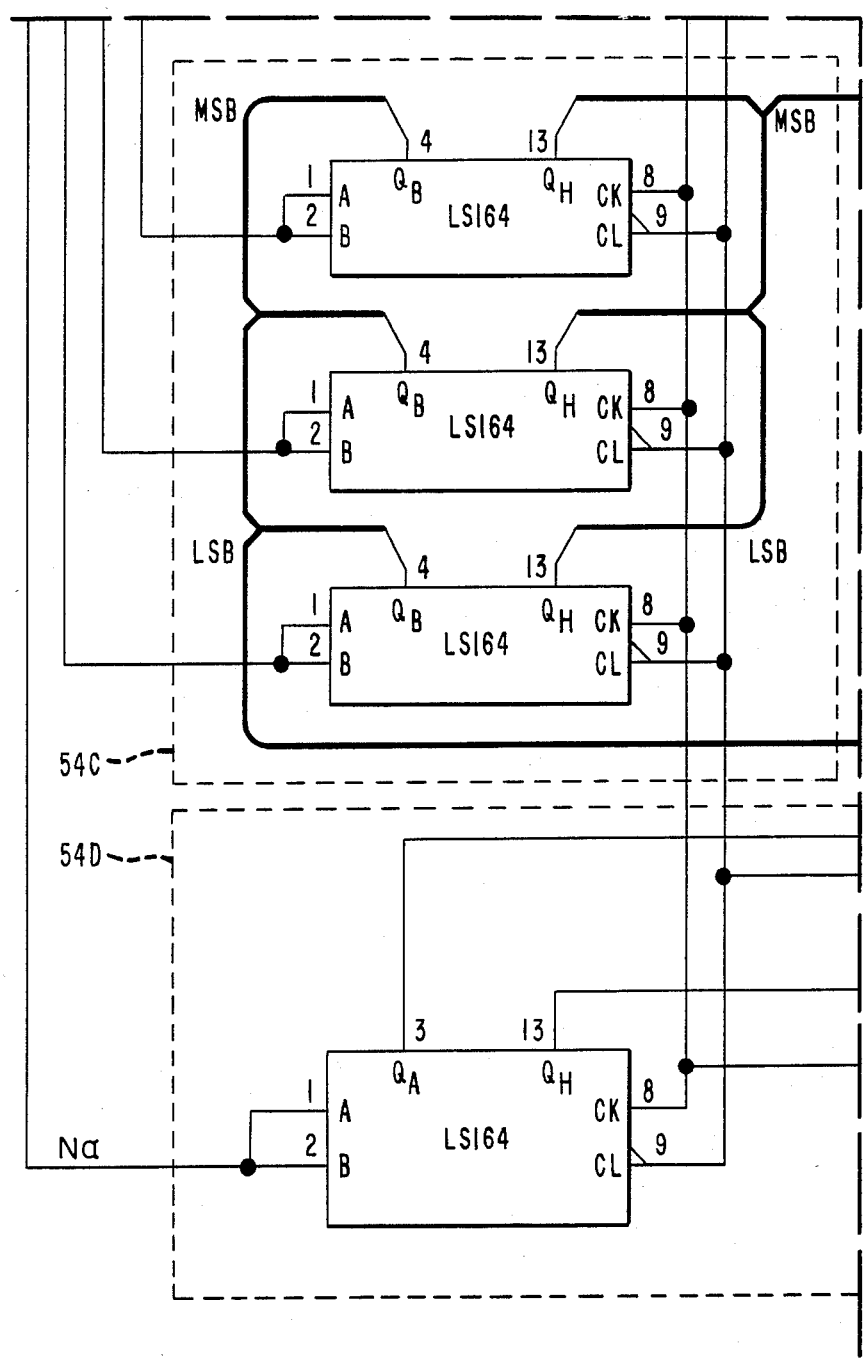
Figure 6I:
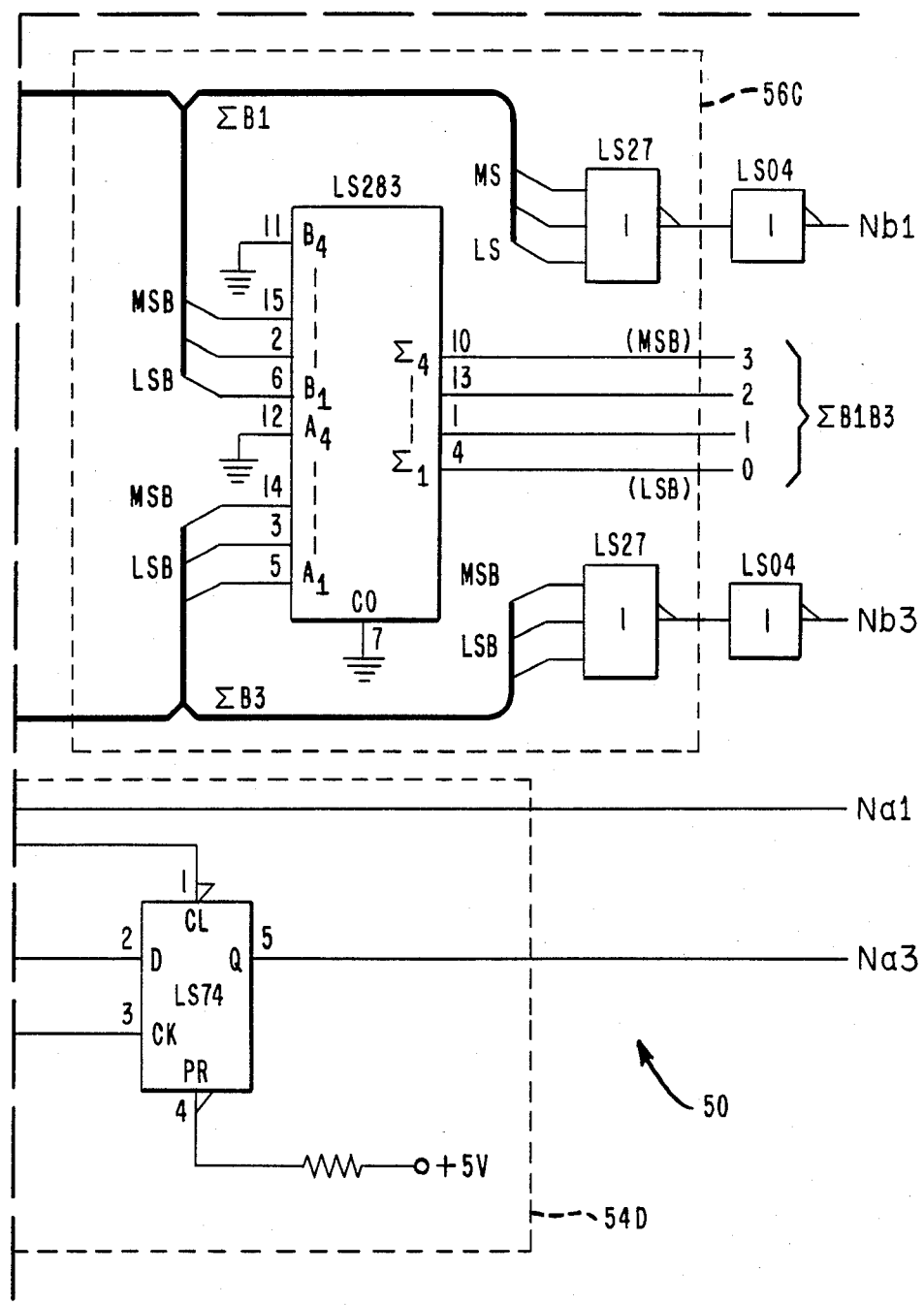
Figure 7A:
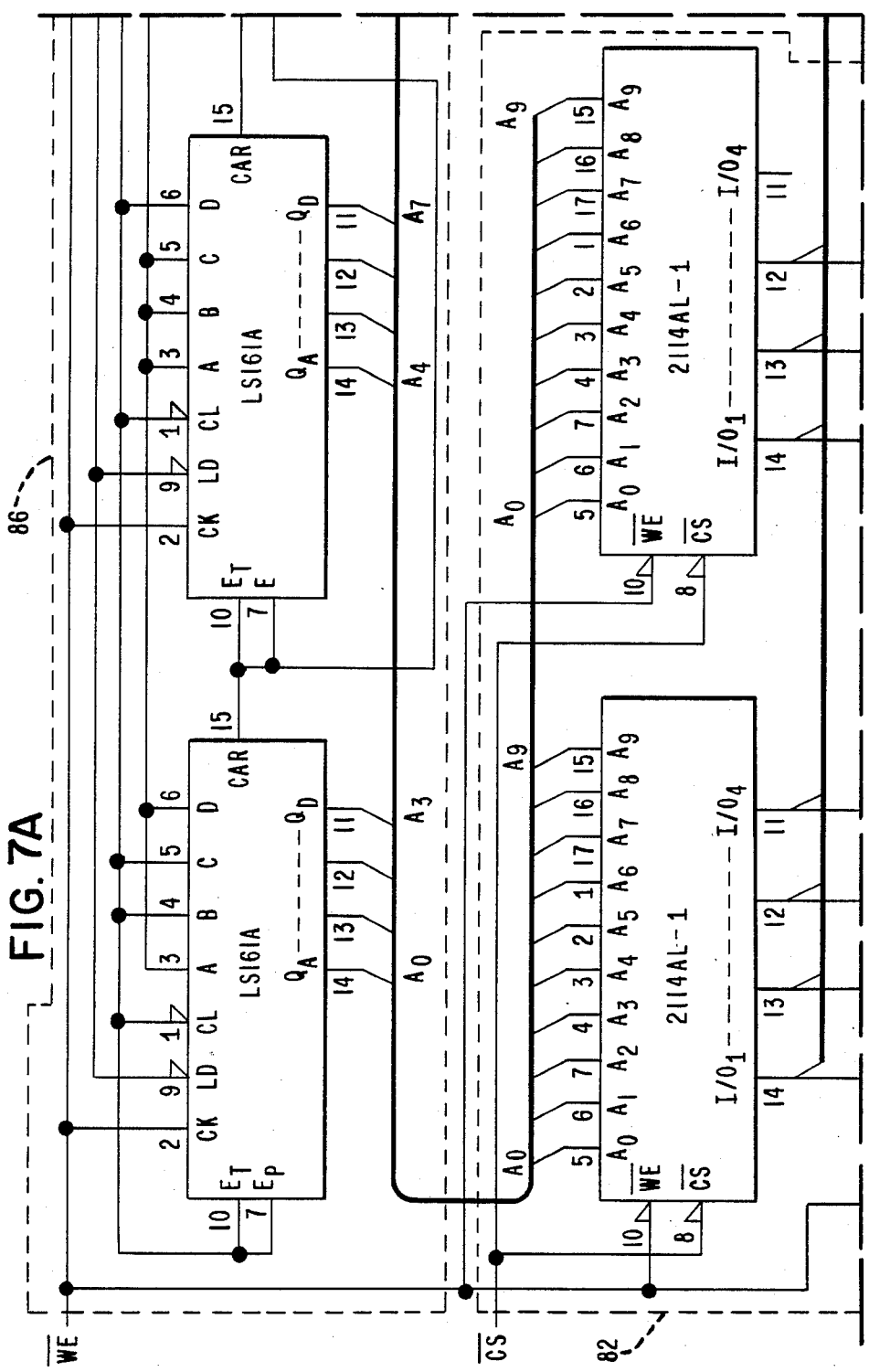
FIGS. 7A–7G illustrate in logic level schematic form a third portion of the preferred embodiment illustrated in block form in FIG. 4.
Figure 7B:
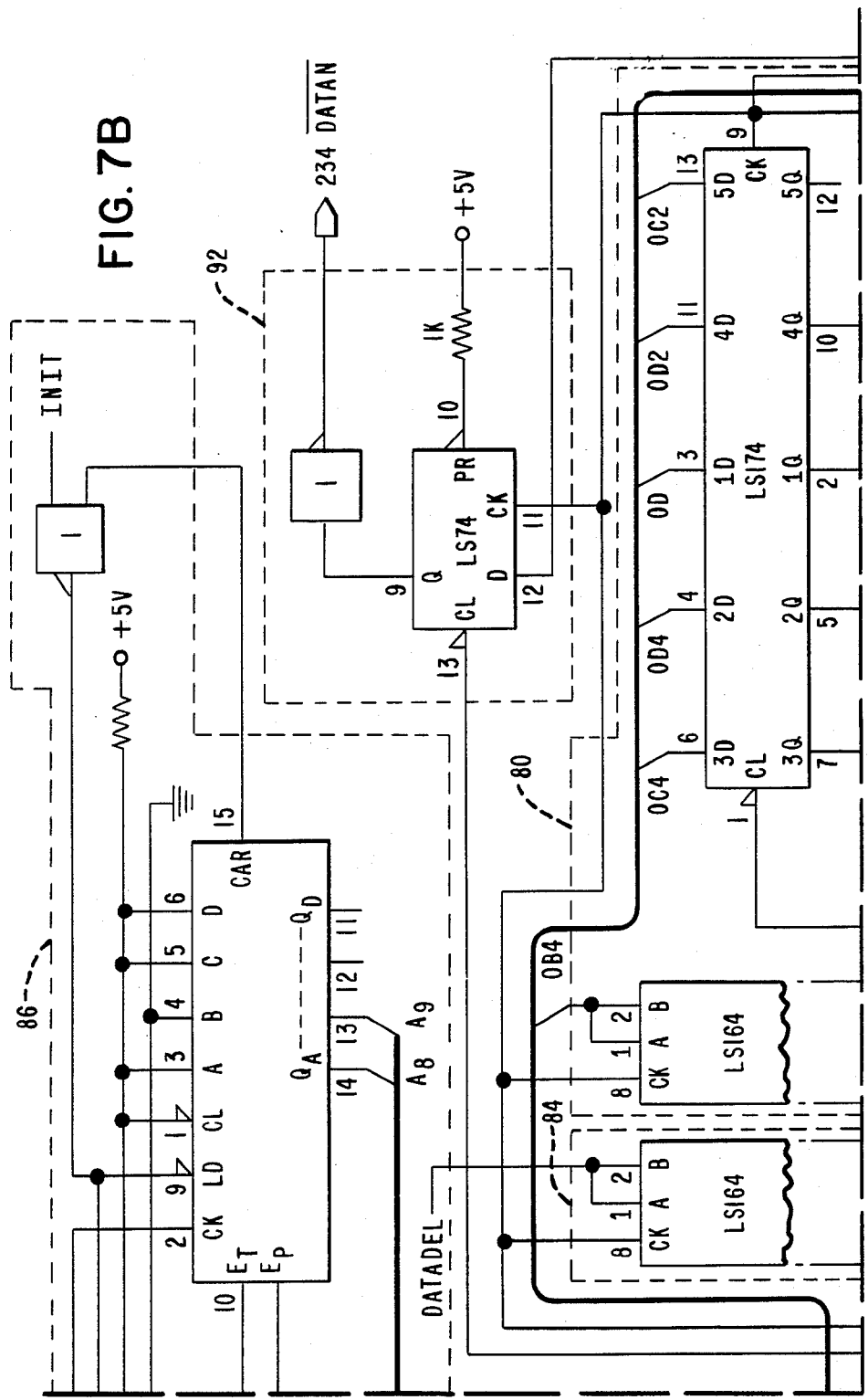
Figure 7C:
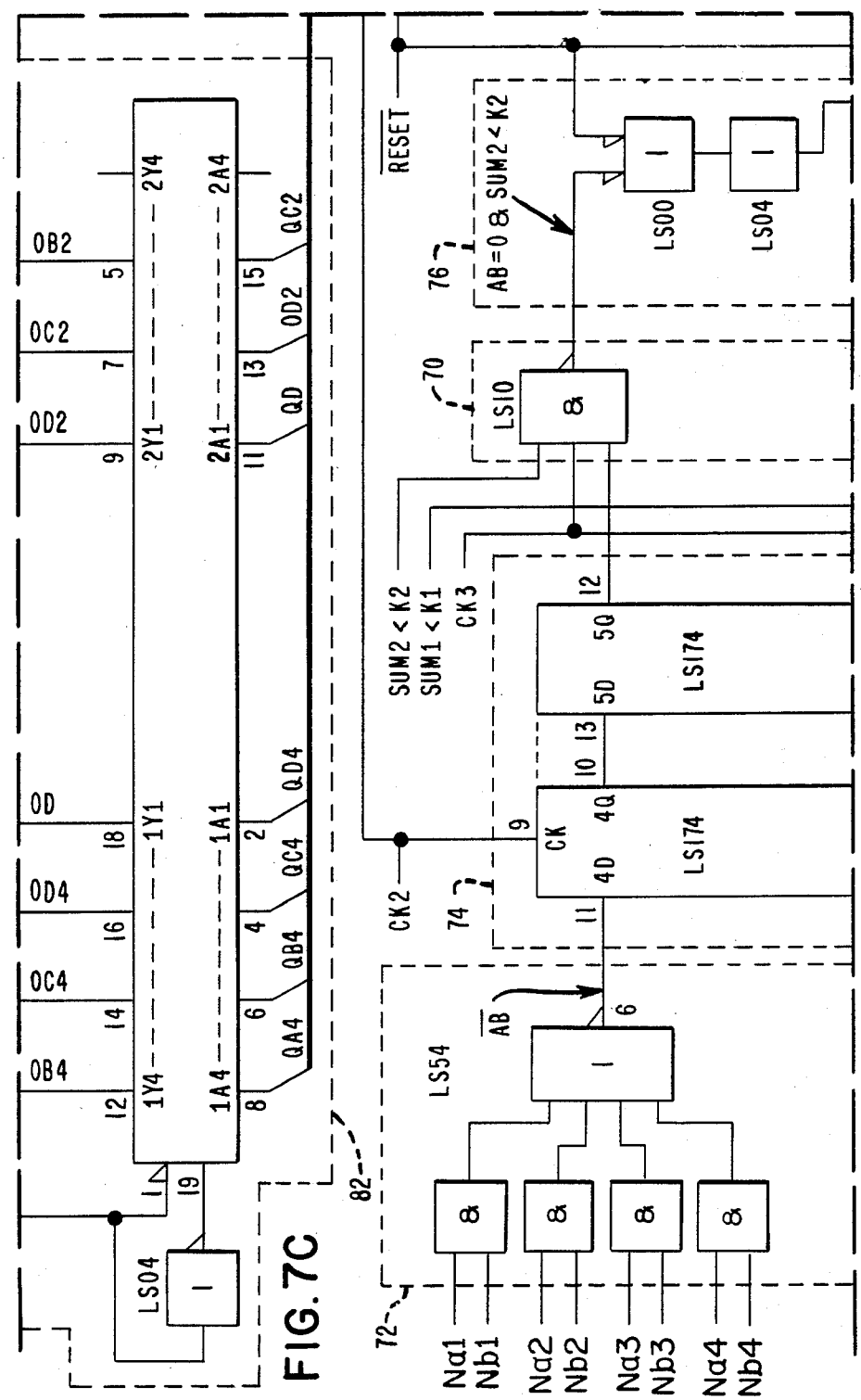
Figure 7D:
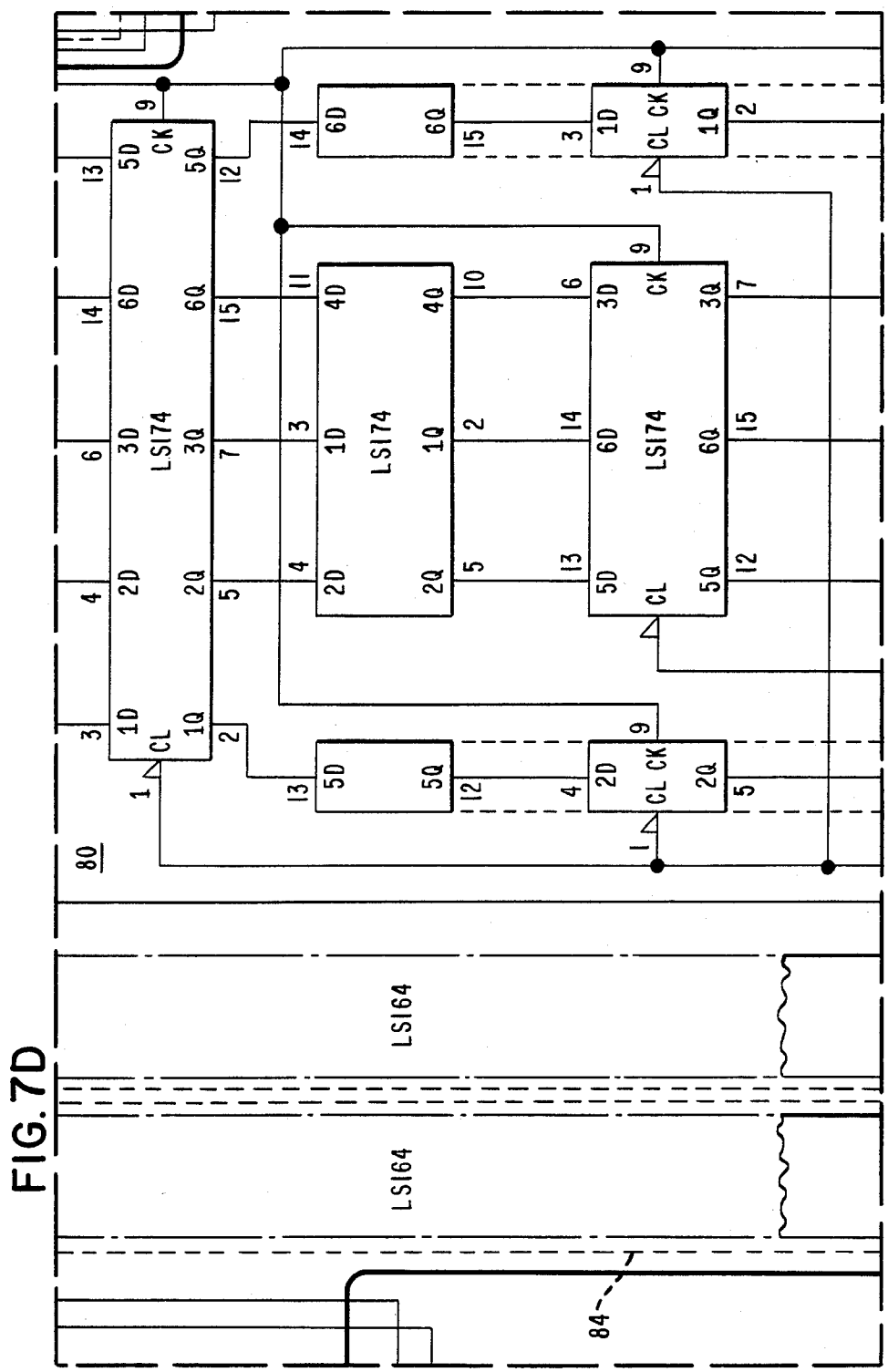
Figure 7E:
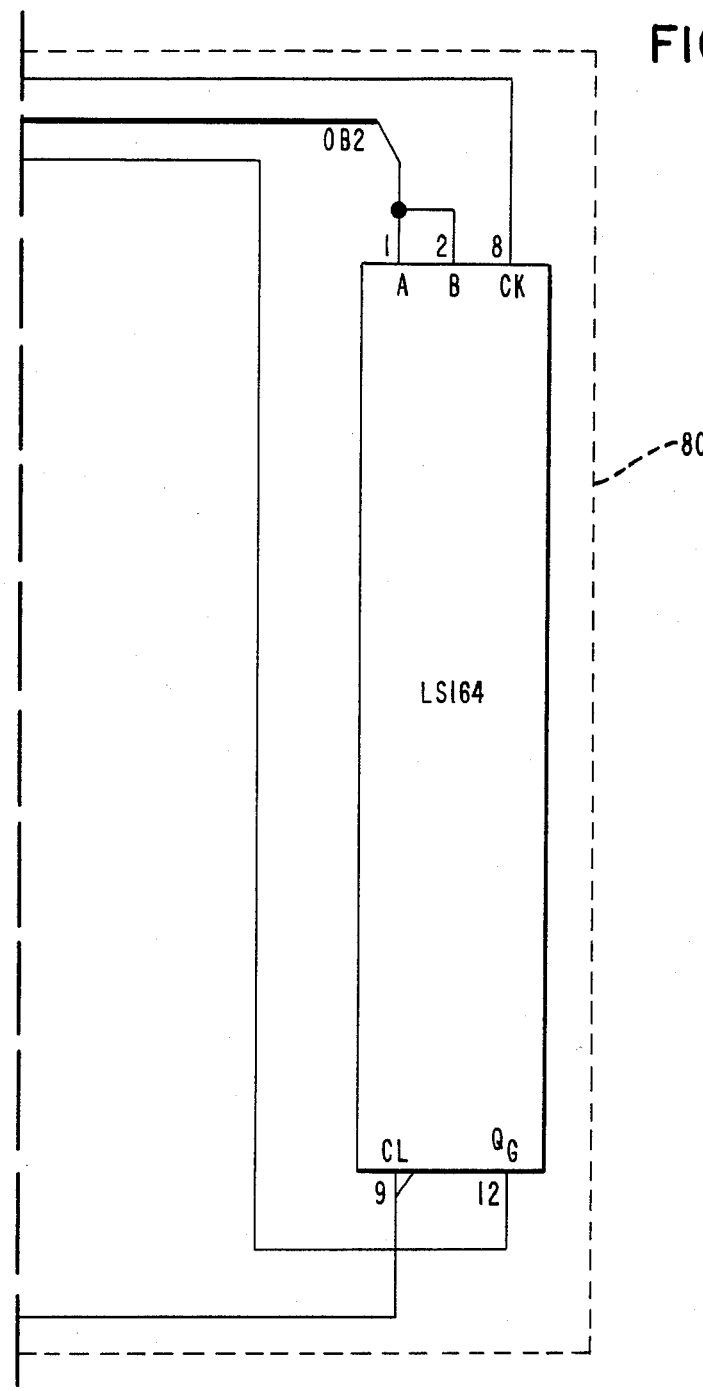
Figure 7F:
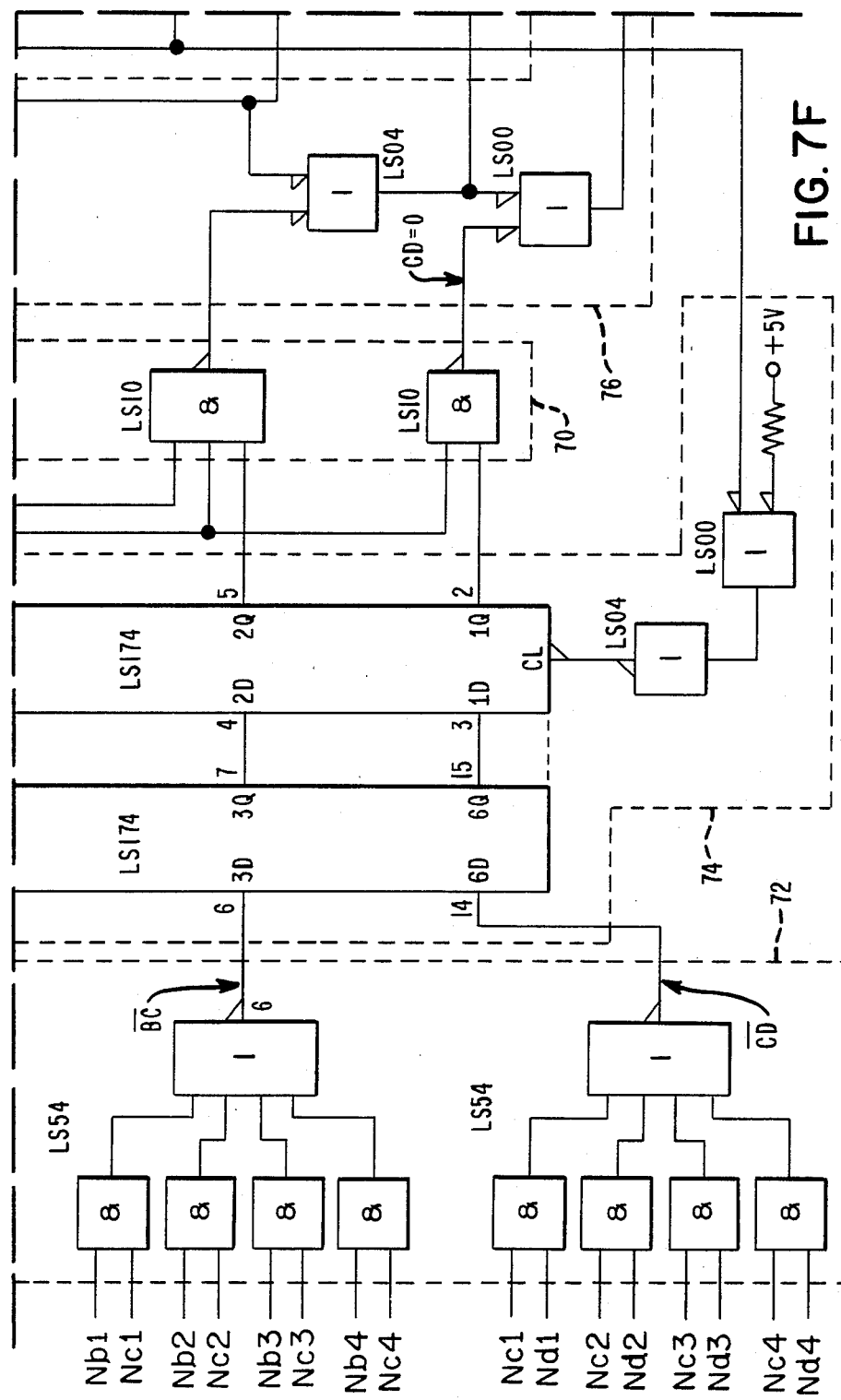
Figure 7G:
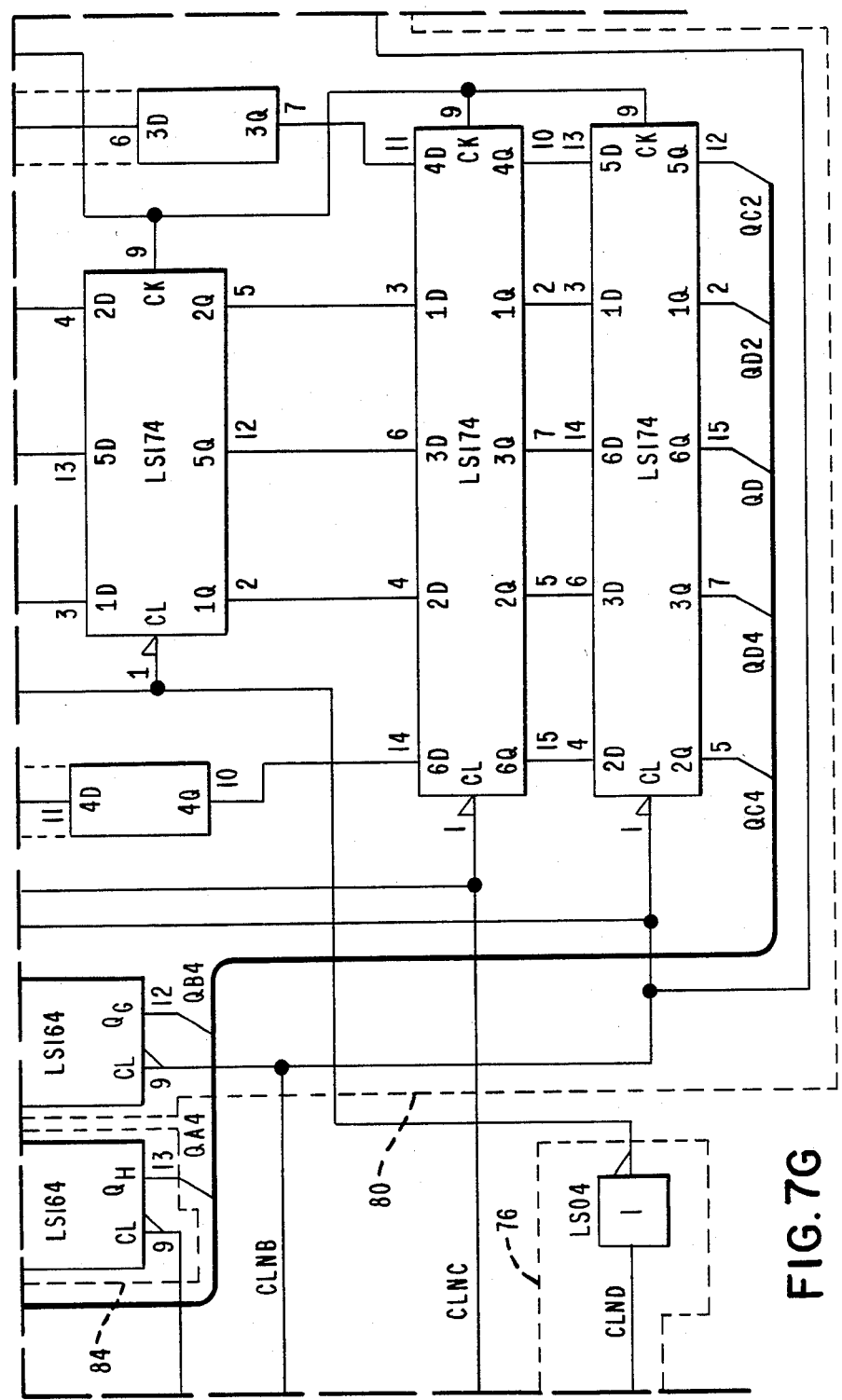

Referring to FIG. 5, wherein is displayed the interconnection map for the drawings 5A-5J, the actual circuit level schematic using commercially available logic chips is shown in FIGS. 5A-5J with the manufacturers identification number assigned to each chip and where applicable, identification of the pin numbers associated with the interconnecting conductors is displayed. Due to the complexity of the actual wiring schematic circuits that make up the blocks disclosed in FIGS. 4A-4F they are surrounded with a dotted outline and provided with a number corresponding to numbered component blocks of FIGS. 4A through 4F. For example, the logic block 19 disclosed in FIG. 4A corresponds to the like numbered dotted block in FIG. 5A shown comprised of three gates labeled LS27 and one gate labeled LS10. In a like manner, the memory array 10, the logic circuit 21, along with the associated components of the memory array 10, the summation circuit 60 and 62, along with the constant signal level generator 65 and 66 with the 6 bit magnitude comparator 64 and the retime circuit 68 are shown in detail in FIGS. 5A-5J.

Referring now to FIGS. 7A-7I, the Figures disclose the integrated circuit level schematic for the circuits corresponding to the blocks 70, 72, 74, 76, and 92. Again, the interconnection of each of the commercially available integrated circuit chips is clearly ascertained from the drawing without further verbal description.

Referring now to FIGS. 6A-6I, the interconnections for the integrated circuits corresponding to the block 30 circuits of FIGS. 4A-4F are blocks 52, 56A-56C and 54A-54D.

While there has been shown what is considered to be the preferred embodiment of the invention, it will be manifest that many changes and modifications can be made herein without departing from the spirit and scope of the invention, the scope of the invention being limited only by the scope of the appended claims.

We claim:

1. Apparatus for removing noise from signals representing a square matrix of binary picture elements comprising:
   (a) computing matrix means for providing column sums from the square matrix of binary signals, each having a state corresponding to the color level of a portion of a scanned image;
   (b) means operatively coupled to said computing matrix means for providing row sums from said binary signals;
   (c) modifying matrix means for receiving the matrix of binary signals from said computing matrix means and for changing the state of the binary signals in select combinations of connected rows and columns in response to a clean signal; and
   (d) logic means comprised of:
      (i) means for determining a first sum of all the binary signals, of one state, present in the two innermost adjacent rows and columns of the square matrix; and
      (ii) means for determining a second sum of all the binary signals, of one state, present in the rows and columns adjacent the two innermost rows and columns and the first sum, said first and second sums being compared against pre-selected values to identify the presence of spurious binary signals that do not correspond to the scanned image and to provide a clean signal to said modifying matrix means for deleting said spurious binary signals from said modifying matrix means.

2. The apparatus according to claim 1 wherein said computing matrix means is formed as concentric windows of rows and columns.

3. The apparatus according to claim 1 and further comprising:
   timing means operatively coupled to said computing matrix means for incrementing into said computing matrix means binary signals representing a different portion of said scanned image.

4. The apparatus according to claim 1 wherein said square matrix of binary signals is a 9×9 matrix of four concentric windows centered around a binary signal of interest.

5. The apparatus according to claim 1 and further comprising; decision logic for providing said clean signal if binary signals of one selected state are not present in adjacent rows and columns and said first and second sums are below said preselected values.

6. Apparatus for removing noise from binary signals representing, in matrix form, a portion of a scanned image comprising:
   (a) storage means for receiving said binary signals in serial order and for arranging said binary signals in a matrix corresponding to a portion of a scanned image;
   (b) first logic means coupled to said storage means for providing column sum signals, indicative of the number of binary signals of one state present in each column of said matrix;
   (c) means operatively coupled to said storage means for providing row sums from said binary signals;
   (d) modifying matrix means for receiving the matrix of binary signals from said storage means and for changing the state of the binary signals in select combinations of connected rows and columns in response to a clean signal; and
   (e) second logic means for combining select row and column sums and for comparing said combined sums against pre-selected values to identify the presence of spurious binary signals that do not correspond to the scanned image and to provide a clean signal to said modifying matrix means for deleting said spurious binary signals from said modifying matrix means comprising:
      (i) means for determining a first sum of all the binary signals, of one state, present in the two innermost adjacent rows and columns of the square matrix; and
      (ii) means for determining a second sum of all the binary signals, of one state, present in the rows and columns adjacent the two innermost rows and columns and the first sum column, said first and second sums being compared against said pre-selected values to identify the presence of spurious binary signals.

7. The apparatus according to claim 6 wherein said storage means arranges said binary signals as concentric windows of rows and columns.

8. The apparatus according to claim 6 and further comprising:
   timing means operatively coupled to said storage means for incrementing into said matrix binary signals representing a different portion of said scanned image.

9. The apparatus according to claim 6 and further comprising; decision logic for providing said clean signal if binary signals of one selected state are not present in adjacent rows and columns and said first and second sums are below said preselected values.

10. The apparatus according to claim 6 wherein said matrix of binary signals is a 9×9 matrix of four concentric windows centered around a binary signal of interest.

* * * * *